(12) United States Patent
Zapletal

(10) Patent No.: US 6,702,265 B1
(45) Date of Patent: Mar. 9, 2004

(54) BALANCED SUSPENSION SYSTEM

(76) Inventor: Erik Zapletal, Lot 37, Old Northern Road, Canoelands, New South Wales 2157 (AU)

( * ) Notice: Subject to any disclaimer, the term of this patent is extended or adjusted under 35 U.S.C. 154(b) by 0 days.

(21) Appl. No.: 09/913,224

(22) PCT Filed: Feb. 10, 2000

(86) PCT No.: PCT/AU00/00086

§ 371 (c)(1),
(2), (4) Date: Aug. 9, 2001

(87) PCT Pub. No.: WO00/47434

PCT Pub. Date: Aug. 17, 2000

(30) Foreign Application Priority Data

Feb. 10, 1999 (AU) ............................................. PP8604
Feb. 17, 1999 (AU) ............................................. PQ4767

(51) Int. Cl.⁷ .............................................. B60G 21/06
(52) U.S. Cl. ........................ 267/187; 267/190; 267/222; 267/224; 267/225; 280/124.104; 280/124.106; 280/124.179
(58) Field of Search ................... 280/124.128, 124.104, 280/124.106, 124.179; 267/186, 187, 188, 189, 190, 222, 223, 224, 225, 275

(56) References Cited

U.S. PATENT DOCUMENTS

| 4,607,861 | A | * | 8/1986 | Eisenberg et al. | ........ | 267/64.11 |
|---|---|---|---|---|---|---|
| 4,938,499 | A | * | 7/1990 | Kawabata | ................ | 280/5.508 |
| 5,447,332 | A | * | 9/1995 | Heyring | ............... | 280/124.104 |
| 5,566,970 | A | * | 10/1996 | Lin | ..................... | 280/124.106 |
| 5,662,356 | A | * | 9/1997 | Lund | ........................ | 280/5.502 |
| 5,899,472 | A | * | 5/1999 | Burke et al. | .......... | 280/124.106 |
| 5,941,546 | A | * | 8/1999 | Pellerin | ................ | 280/124.116 |
| 6,102,418 | A | * | 8/2000 | Runkel | ................. | 280/124.106 |
| 6,179,310 | B1 | * | 1/2001 | Clare et al. | ........... | 280/124.159 |
| 6,217,047 | B1 | * | 4/2001 | Heyring et al. | ........ | 280/124.106 |
| 6,220,613 | B1 | * | 4/2001 | Franzini | .............. | 280/124.106 |
| 6,267,387 | B1 | * | 7/2001 | Weiss | ......................... | 280/5.52 |
| 6,270,098 | B1 | * | 8/2001 | Heyring et al. | ........ | 280/124.161 |
| 6,276,710 | B1 | * | 8/2001 | Sutton | ......................... | 280/678 |
| 6,302,417 | B1 | * | 10/2001 | Heyring | ............... | 280/124.106 |
| 6,428,024 | B1 | * | 8/2002 | Heyring et al. | ........ | 280/124.106 |
| 6,499,754 | B1 | * | 12/2002 | Heyring et al. | ........ | 280/124.106 |

FOREIGN PATENT DOCUMENTS

| WO | WO95/23076 | 8/1995 | | |
|---|---|---|---|---|
| WO | WO98/28160 | 7/1998 | | |
| WO | WO98/47730 | 10/1998 | | |
| WO | Wo 98/47730 | * 10/1998 | .......... | 280/124.104 |
| WO | WO98/58811 | 12/1998 | | |

* cited by examiner

Primary Examiner—Christopher P. Schwartz
Assistant Examiner—Devon Kramer
(74) Attorney, Agent, or Firm—Henricks, Slavin & Holmes LLP

(57) ABSTRACT

A balance suspension system for a vehicle having a body and at least four wheels (FR, FL, BR, BL) independently supported for movement between upper and lower positions relative to the body, the suspension system includes a balance mechanism adapted to support suspension forces in the vehicle and a plurality of actuating elements (73, 74, 78, 79) which are responsive respectively to the positions of the wheels relative to the body and are operable on spaced apart points on the balance mechanism. The system also includes control means for controlling relative movement between the balance mechanism and the body. The control means act to redistribute suspension forces between the body and the wheels, thereby to induce predetermined suspension behaviour.

34 Claims, 20 Drawing Sheets

EXAMPLE

| DEGREE OF FREEDOM | FR | FL | BR | BL |
|---|---|---|---|---|
| VALUE | 4 | 0 | 0 | 0 |

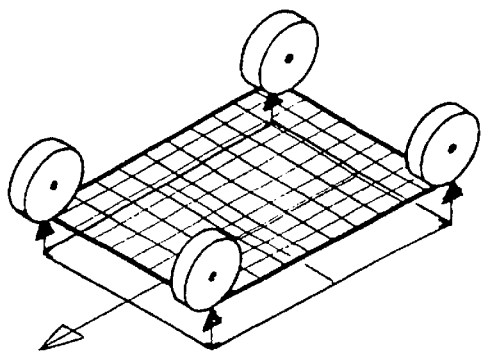
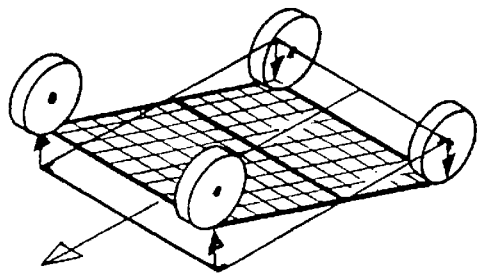
FIGURE 3a - BOUNCE          FIGURE 3b - PITCH
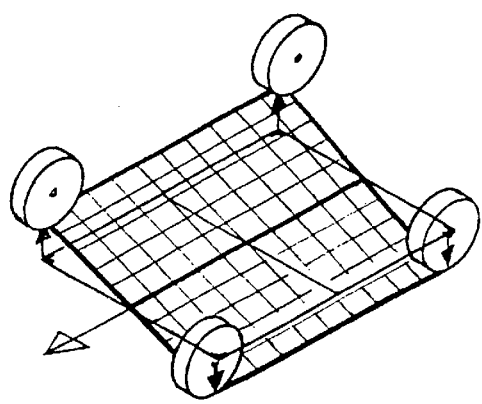
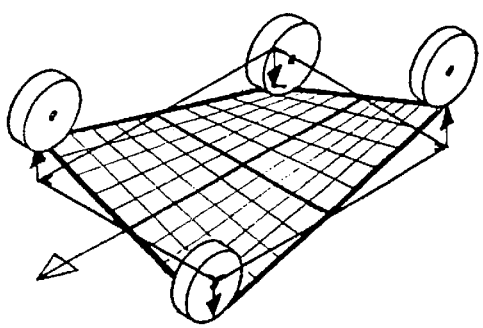
FIGURE 3c - ROLL            FIGURE 3d - TWIST
EXAMPLE
| DEG. OF FREEDOM | BOUNCE | PITCH | ROLL | TWIST |
|---|---|---|---|---|
| VALUE | 1 | 1 | 1 | 1 |

BOUNCE  PITCH  ROLL  TWIST

BOUNCE    PITCH    ROLL    TWIST

BOUNCE   PITCH   ROLL   TWIST

BOUNCE    PITCH    ROLL    TWIST

| Permutation | | | Wheelprint | Bounce | Pitch | Roll | Twist |
|---|---|---|---|---|---|---|---|
| 1 | 1 2<br>4 3 | | | B | P | R | T |
| 2 | 1 2<br>3 4 | | | B | P | T | R |
| 3 | 1 4<br>2 3 | | | B | R | P | T |
| 4 | 1 3<br>2 4 | | | B | R | T | P |
| 5 | 1 4<br>3 2 | | | B | T | P | R |
| 6 | 1 3<br>4 2 | | | B | T | R | P |
| 7 | 1 2<br>-3 -4 | | | P | B | R | T |
| 8 | 1 2<br>-4 -3 | | | P | B | T | R |
| 9 | 1 4<br>-3 -2 | | | P | R | B | T |
| 10 | 1 3<br>-4 -2 | | | P | R | T | B |
| 11 | 1 4<br>-2 -3 | | | P | T | B | R |
| 12 | 1 3<br>-2 -4 | | | P | T | R | B |
| 13 | 1 -3<br>2 -4 | | | R | B | P | T |
| 14 | 1 -4<br>2 -3 | | | R | B | T | P |
| 15 | 1 -3<br>4 -2 | | | R | P | B | T |
| 16 | 1 -4<br>3 -2 | | | R | P | T | B |
| 17 | 1 -2<br>4 -3 | | | R | T | B | P |
| 18 | 1 -2<br>3 -4 | | | R | T | P | B |
| 19 | 1 -3<br>-4 2 | | | T | B | P | R |
| 20 | 1 -4<br>-3 2 | | | T | B | R | P |
| 21 | 1 -3<br>-2 4 | | | T | P | B | R |
| 22 | 1 -4<br>-2 3 | | | T | P | R | B |
| 23 | 1 -2<br>-3 4 | | | T | R | B | P |
| 24 | 1 -2<br>-4 3 | | | T | R | P | B |

BALANCED SUSPENSION SYSTEM

FIELD OF THE INVENTION

This invention relates to a suspension system for a vehicle having four or more wheels.

The invention has been developed primarily for use in motor cars of various types and will be described hereinafter with reference to that application. However, it will be appreciated that the invention is not limited to that particular field of use.

BACKGROUND OF THE INVENTION

All vehicles that travel over, and support themselves from the ground, benefit from having a compliant suspension system. The suspension allows the vehicle and its contents to travel in a relatively smooth path while the suspension accommodates for the unevenness of the ground and keeps the wheels in contact with the road.

If a car is designed primarily for a comfortable "ride" it is provided with soft, long travel suspension springs to absorb the bumps on the road. However, when such a car drives around a corner at speed the body "rolls" outwards. This is uncomfortable for the passengers and can also reduce the precision with which the car can be placed on the road, thus impairing the "handling" of the car. On the other hand, a car designed primarily for good handling is usually provided with stiff, short travel springs which make the car feel more responsive to the driver's inputs, but also make the ride harsh over bumps and reduce the total "grip" of the tyres on the road. The choice between soft and stiff springing is often called the "ride-handling" compromise.

Some expressions with common but perhaps vague meanings are more closely defined below.

The term "car" will be used to cover cars, trucks, trailers, caravans, etc., generally with four wheels but possibly with more.

The "suspension" of the car refers to the mechanisms which connect the wheels to the "body" of the car (also called the "sprung-mass") allowing the wheels to move in a predominantly vertical direction whilst also supporting the weight of the car. Most cars have a single "spring-damper" unit which controls this vertical movement of each wheel, while some cars have additional springs which are connected to more than one wheel.

A "spring" is any elastic element that will deflect by a predetermined and significant amount when a force is applied to it, and then return to its original length when the force is removed. A spring can be made of any of the common materials such as steel, rubber, fibreglass or compressed gas in a container. The ratio of applied force increment per deflection increment (measured in pounds-per-inch or newtons-per-meter) is called the "spring rate". For most steel springs, the spring rate is constant and is determined by the size of the spring. However, due to leverages in the suspension mechanism, the deflection for a given load increment at the wheelprint, called the "wheel rate", is usually different to the spring rate and can vary as the suspension deflects. This is termed "variable-rate" springing.

An uncontrolled spring-mass system will oscillate indefinitely when set in motion. It is the function of the "dampers" to minimise the unwanted oscillations. The main characteristics of dampers is that they only exert a force on the suspension when the suspension is moving (that is, moving up or down), and the force is always in the direction opposite to that of the suspension movement. The force exerted is therefore a function of the velocity of the suspension and is almost always of variable rate.

Any solid object can move with six "degrees of freedom" with respect to another solid object. For vehicles (of all types) it is usual to use a rectangular coordinate system fixed to the vehicle to describe the motion of the vehicle body with respect to the ground. The degrees of freedom are then usually named "forward/backward" for longitudinal motion of the body; "sideslip" for lateral motion of the body; "bounce" (or "heave") for vertical motion of the body; "roll" for rotation around a longitudinal axis through the body; "pitch" for rotation about a lateral axis; and "yaw" for rotation about a vertical axis (see FIG. 1). This assumes that the body is relatively rigid. Note also that for a car travelling on an essentially flat surface only bounce, pitch and roll motions will cause vertical movements of the suspension.

While the vehicle body moves with respect to the ground, the wheels can also move with respect to the body. This movement refers only to the relative motion between the body and the contact area between wheel and ground and not to wheel rotation, steering and so on. For the purpose of this discussion, only the one degree of freedom of motion that each "wheelprint" has along a predominantly vertical linear path will be considered. So, for a car with four wheels there are four degrees of freedom for the motion of the four wheelprints with respect to the body. To put it another way, it would be necessary to specify four separate parameters (one for each degree of freedom) to completely define the positions of all four wheelprints with respect to the body. The simplest way to do this is to specify the vertical position of each wheelprint with respect to the body (see FIG. 2).

Another way of specifying the four wheelprint positions is shown in FIG. 3 and is called a "modal" description of the suspension. Each mode (or degree of freedom) involves the movement of all four wheels. The first three modes of "bounce", "pitch" and "roll" are similar but opposite to the motions of the body with respect to ground. That is, as the body bounces down towards the ground, the wheelprints bounce up towards the body, and similarly for pitch and roll. These three modes are chosen because they can be directly related to the similar motions of the body.

Any combination of suspension bounce, pitch and roll will always keep all four wheelprints in a "flat" plane. However any stretch of road will, in practice, have some degree of unevenness. Small scale unevenness will be referred to as "bumps" while larger scale unevenness of the road surface will be called "twist". Bumps are typically shorter in length than the car's wheelbase while twist of the road surface is a bump that is longer than the wheelbase. This unevenness will inevitably try to force one wheelprint out of the plane defined by the other three wheelprints. The fourth mode of suspension movement, shown in FIG. 3d, is "twist" and is the only mode that allows all four wheelprints to stay in contact with uneven ground.

The units used to measure the modes in FIGS. 3a to 3d are linear (for example, metres or inches). Angular units could be used for pitch, roll and twist. However, it is more convenient to use linear units for all the modes as it is then a simple matter of summation to calculate the heights of the individual wheelprints. The two sets of wheelprint positions shown in FIG. 2 and FIG. 3 describe the same physical situation. It is seen that a single wheel bounce is made up of one quarter contributions of the four modes of bounce, pitch, roll and twist. Also for equal loading on all wheels the single wheel spring rate is given by the summation of one-sixteenth of each of the spring rates in bounce, pitch, roll and twist.

The four modes of suspension movement of bounce, pitch, roll and twist are introduced here because they are the key to understanding the operation of the suspension system of the present invention which will be described later.

Requirements of a "Good" Suspension

There are many aspects of a car's design that affect its dynamic behaviour. The following section considers the contribution of the suspension, as defined above, to handling, ride and grip.

Handling is a subjective concept. It can be described as the precision of feeling that the driver has for the reactions of the car in response to the driver's control inputs. The driver's main inputs to the car are via the accelerator, brake and steering wheel. Therefore the main reactions of the car that the driver wants to feel are a forwards acceleration, or force, in response to the accelerator, a backwards force from the brakes, and a yawing moment followed by a lateral force from the steering. The relative magnitudes of these forces, which come mainly from the four wheelprints, are referred to as the "balance" of the car. If during cornering the lateral forces acting on the front wheels are less than expected then the car is said to "understeer" and conversely if the rear wheels lose grip, then the car "oversteers".

The reactions of the car that a driver wants to feel are mainly those that lie in the horizontal plane. Any bounce, pitch or roll motions that occur in response to the driver's inputs are extraneous and detract from the driver's feel of the car's grip on the road. It can be argued that a car with ideal handling would lean into a comer like a horse, bicycle or aeroplane. This inward roll would be more comfortable, and natural, for the driver because the inertial forces on his body would be directly downwardly into the seat rather than sideways off the seat. Certainly an outward roll is undesirable because it is in the unnatural direction, and results in the driver being lifted out of the seat. Due to the width and relatively low ground clearance of modem cars, the total amount of inward roll possible during fast comers is not enough to completely balance the driver in the seat. Similar arguments can be applied to pitch during acceleration and braking. So as a first approximation, a good handling car should accelerate, brake and corner with a "flat" (horizontal) attitude and with minimal bounce, pitch or roll motions.

For a car to have a comfortable ride over bumps, it should have long travel softly sprung lightweight wheels that bounce vertically with no tilt of the wheel's axle (that is, no "camber change"). Any stiffness in the suspension will result in bumps causing a vertical harshness in the ride. Any excess "unsprung mass" increases the forces necessary to accelerate the wheel up and over the bump and then down on the other side, resulting in a vertical harshness of ride. Any lateral movement of the wheels during bounce (called "scrub") will cause lateral forces to act on the wheel, and any camber change will cause gyroscopic forces to act on the wheel. These lateral and gyroscopic forces will be transmitted from the wheel to the body and will be felt mainly as a horizontal harshness of ride.

A side effect of a car having soft springs and long vertical wheel travel is that it will generally have a lower rolling resistance than a stiff suspension with lots of wheel scrub. Lower rolling resistance leads to lower fuel consumption.

For a car to have good grip on the road it should maximise the amount of available rubber in contact with the road and it should equalise the pressure over all of that rubber. It is commonly thought that a sporty, stiffly sprung car with good handling will automatically have good grip. This is not necessarily so. Beyond an optimum limit, the coefficient of friction between the wheelprint and the road decreases as the pressure between the wheelprint and the road increases. Since all roads have some bumps or twist, a very stiffly sprung car (with all wheelprints fixed in a flat plane) will spend much of the time with only three wheelprints in firm contact with the ground. This means that three quarters of the total wheelprint will be carrying most of the vertical load, thereby increasing wheelprint pressures and reducing their coefficient of friction. This in turn reduces the total grip available for acceleration, braking or cornering. So for good grip on an uneven road a car needs soft springs, or more precisely a soft twist-mode spring rate, to maintain relatively constant loads on each wheelprint. Also the wheels should remain perpendicular to the road surface to maintain an even loading across the width of each wheelprint.

Pitch and Roll Moments

When a car accelerates horizontally (during either acceleration, braking or cornering) there is a rotational force created on the car by the horizontal forces acting from the road on the wheelprints (at ground level) and the inertial forces of the body which can be considered to act at the centre of gravity (always above ground level). This rotational force is called the "gross pitch moment" when caused by longitudinal acceleration and the "gross roll moment" when caused by lateral acceleration.

The above moments cause a transfer of vertical wheel loads from one end or side of the car to the other. So during braking the rear wheels will feel a reduction in vertical load while the front wheels will be subject to an increase in vertical load. Likewise, during cornering, there is a transfer of vertical load from the wheels on the inside of the comer to the wheels on the outside. The above gross moments exist regardless of the type of suspension. They are dependant only on, and are directly proportional to, the acceleration and the height of the centre of gravity.

The response of the car's sprung mass to the above moments is called its "pitch response" and "roll response". Depending on the type of suspension, the sprung mass can remain substantially static during the application of these moments, or it can rotate in the direction of the moment, or it can rotate in the opposite direction to the moment, and it can also simultaneously move in the horizontal and vertical directions. FIGS. 4 and 5 show a method of estimating these responses. The "pitch centre" and "roll centre" are found at the intersections of the perpendiculars to the directions of wheelprint travel, as shown.

The horizontal inertial force acting at the centre of gravity, multiplied by the vertical distance between the centre of gravity and the pitch or roll centre is called the "sprung mass pitch moment' or "sprung mass roll moment". The sprung mass moments are thus a function of the pitch and roll centre heights and can vary enormously between different types of suspension and different displacements of a particular suspension. Note that the sprung mass moments are definitely not the same as the gross moments.

The Problem of "Body Roll"

The amount of "body roll" (that is, sprung mass roll) depends on the relative positions of the roll centre and the centre of gravity, and also on the roll stiffness. Roll stiffness is a measure of the rotational force on the body required to cause unit rotational displacement. It is proportional to the wheel rate and proportional to the square of the "track" (the lateral distance between wheelprint centres). If the roll centre is above the centre of gravity the top of the body will lean into corners while the centre of gravity swings outwardly. If the roll centre is below the centre of gravity, the body rolls and moves outwardly from the corner. When a car has independent suspension and a high roll centre, the cornering forces on the outer wheels are translated into an upwards force on the sprung mass. This is called "jacking". This upwards force raises the body which increases the gross roll moment which can ultimately result in the whole car rolling over.

The requirements of good ride imply that the roll centre be at ground level as this results in zero scrub. However a low roll centre combined with soft springs results in significant body roll during cornering which implies bad handling. Furthermore the ride requirement of zero camber change over bumps means that as the body rolls the plane of the wheel will also roll. This reduces grip since the wheel doesn't remain perpendicular to the ground.

Many sports cars are designed with a low ride height. The reduction in ride height reduces the height of the centre of gravity which in turn reduces the gross roll moment for a given lateral acceleration and so reduces lateral load transfer. The reduction in load transfer reduces the difference between pressures on the inner and outer wheelprints and thus increases overall grip. However, to prevent the suspension from bottoming out over bumps, the springs have to be made stiffer. The stiffer springs are also better able to resist the sprung mass roll moment so the car corners flatter with less roll and there is a feeling of improved handling. This works well on relatively flat racing tracks. However, whenever there is a significant amount of twist in the road surface (and this twist often occurs in a corner) then the stiffly sprung car loses grip, often unpredictably, which can lead to a feeling of worse handling. So even though racing car designers are not primarily concerned with a comfortable ride, they nevertheless try to use springs that are as soft as possible together with a low roll centre (to minimise jacking)—which inevitably results in some body roll.

Why Pitch is Less of a Problem

Body pitch under acceleration or braking is less of a problem than body roll during cornering for the following reasons. Raising the pitch centre above ground level does not cause wheel scrub because the wheel is moving in the direction in which it is free to roll (see FIG. 4). The wheel has to roll slightly faster and then slightly slower as it goes over a bump but this is less of a problem than scrub. Also the jacking effect for a given height of pitch centre is inversely proportional to the wheelbase so the effect is less than that of roll.

Pitch stiffness is proportional to wheelbase (longitudinal distance between wheelprints) squared just as roll stiffness is proportional to track squared. Since wheelbase is typically one-and-a-half to two times the track dimension then for equal wheel rates the pitch stiffness will be two to four times the roll stiffness.

The moment of inertia (the inertial resistance of a mass to rotation) of a car body is usually several times greater in pitch than in roll. This means that there is a greater dynamic resistance from the body to pitch, say from a short stab of the brakes, than there is to roll, say, from a sharp steering movement.

Raising the pitch centre reduces the sprung mass pitch moment. The greater wheelbase increases the static resistance to pitch, and the greater pitch moment of inertia increases the dynamic resistance to pitch. Acting together, these three factors can greatly reduce the amount of pitch compared with roll.

Prior Art Solutions to the Problem of Body Roll

The following notes cover some of the ways in which car manufacturers have tried to find a suitable compromise between body roll and good handling, ride and grip. The listing is roughly chronological, starting at the turn of the century.

Stiff Springs and a Flexible Chassis

The suspension of early model cars consists of beam axles with relatively stiff leaf springs, narrowly spaced on the axle, connected by a chassis with low torsional stiffness. The advantages of this system are that with the roll centre at about axle height and stiff springs there is little body roll. The stiff springs also give high bounce and pitch stiffness allowing for heavy loads without bottoming. However the main advantage of this system is that the twist mode is very soft so all four wheels can stay in contact with the ground over uneven, twisting terrain thus evenly distributing the load over the four wheelprints and maximising overall grip.

The disadvantages are a rough ride due to the stiff springs, and an even worse ride due to the chassis acting as an undamped spring-mass system that is excited into oscillation by every bump. The body also tends to fall apart because it is built on a flexible platform, unless the body is even more flexible than the chassis, for example in the case of a canvas canopy.

The advantages of the above system, particularly its load carrying capability, are such that it is still used by almost all trucks built today. The problems of poor ride and the body falling apart are solved by having a relatively rigid "cab" which is mounted on its own suspension above the front axle while the payload is carried separately over the rear axle.

High Roll Centre

Manufacturers first started fitting cars with independent suspensions in around the 1930s. Since the cars of this era were relatively tall with a large ground clearance (to cope with the rougher roads) the independent suspensions were often designed with a high roll centre to limit roll to an amount similar to that of the beam axle cars. The independent suspension cars generally rode better than the beam axle cars, mainly due to their lower unsprung masses. However the high roll centres together with the even higher centres of gravity meant that jacking (especially with rear independent suspension), and the possibility of complete rollover of the car that often accompanied it, was a real problem.

"Anti-roll" Bars

By the 1950s most manufacturers who were using independent suspensions were designing them with relatively low roll centres. Low roll centres minimise jacking, minimise scrub (which improves ride) but result in more roll during cornering.

By far the most common solution to the roll problem has been the fitting of anti-roll bars, also called sway bars or stabiliser bars (see FIG. 6). An anti-roll bar is a torsion spring connected between the front pair of wheels or between the rear pair of wheels. It works by allowing similar motions but resisting differential motions of the two wheels in the pair. So when both wheels move up or down together, the spring provides no resistance. However, when one wheel moves up and the other moves down, the spring is deflected and exerts a downwards force on the higher wheel and an equal but upwards force on the lower wheel, thereby tending to restore the two wheels to an equal height.

The advantages of anti-roll bars are that they are simple, inexpensive, easy to fit (either during manufacture or as aftermarket accessories), don't affect the bounce mode or pitch mode spring rate, and can reduce body roll by any desired amount (a thicker bar gives less roll). The disadvantages are that they stiffen the single wheel bounce rate giving a harsher ride, and worse still, that they also act as an anti-twist mode bar. In fact, they increase the twist mode stiffness by the same amount as they increase roll stiffness. Thus, stiff anti-roll bars fitted front and rear will tend to keep all four wheelprints coplanar and thus reduce the ability of all wheelprints to stay in contact with uneven ground. This in turn reduces overall grip. In fact, if a car has an oversteering problem due to lack of grip at the rear wheels, then a common cure is to fit a stiff front anti-roll bar because this will reduce the cornering grip of the front wheels and bring the car's handling back into balance, albeit by further compromising overall grip.

Anti-roll-anti-bounce Springs

A less common solution to body roll is to fit springs that connect front and rear wheels on the same side of the car in pairs (see FIG. 7). Variations on this idea are used in the "Citroen 2CV" and "BMC" cars fitted with "Hydrolastic" or "Hydragas" suspensions. The interconnecting springs are arranged to allow differential motions but resist similar motions between the two wheels on each side of the car. The end result is to stiffen the bounce and roll modes while leaving the pitch and twist modes relatively soft.

The advantages of this system are that the relatively stiff roll mode reduces body roll during cornering, the soft pitch mode reduces harsh pitching motions over bumps, and the soft twist mode keeps all wheelprints in contact with uneven ground thus giving high grip. The disadvantages are that bounce stiffness increases with roll stiffness, so that high roll stiffness will give a harsh ride in bounce. Also, the distance of the interconnection is longer than for roll bars, requiring either a well laid out integrated design (2CV) or the use of hydraulics (BMC), which also means that it is not easy to fit the system aftermarket. Moreover, this system cannot readily be used to balance the handling in the same way as roll bars can.

Of course, the mode stiffnesses discussed above are relative—a Citroen 2CV still rolls a lot during cornering, because it was designed primarily for a soft ride. However, its pitch and twist mode stiffnesses are even softer than the bounce and roll stiffness.

Improved Dampers

Another approach, popular with some French manufacturers during the 1950's, 60's and 70's, was to accept relatively large angles of body roll but to control the transient roll response with the dampers. In these systems the dampers are designed to offer a high rate of resistance to slow movements of the suspension and a lower rate to faster movements. They do this by using spring loaded valves that stay closed during slow movements but open up and reduce resistance during faster movements.

The advantages are that as the car enters a corner the relatively slow rolling motion is resisted and controlled by the dampers until the car settles gracefully to its steady state roll angle, while the faster bump movements are passed through to the springs without excess harshness.

One disadvantage of such systems is that there is excess body roll which detracts from the handling and can be uncomfortable for the passengers. Another disadvantage is that the roll can also cause the wheels to move away from being perpendicular to the road, which reduces grip.

Active Suspension

The most sophisticated approach to resolving the ride-handling compromise are so called active suspension systems. These come in varying degrees of sophistication but typically they have sensors that detect changes in suspension position, actuators that can vary the forces on the suspension, and some kind of controller that monitors the sensors and then directs the actuators.

The simplest of these systems merely controls the damper valving in response to a driver selectable dashboard switch. The more advanced systems have a substantial power source that can rapidly move the individual wheels up and down in response to the controller's direction. Typically the power source is an engine driven hydraulic pump with a computer controlling solenoid valves that actuate hydraulic rams which in turn move the suspension arms.

The advantage of these systems is that in principle they can deliver any sort of ride and handling behaviour that the designers desire. The major disadvantages are complexity and expense. Even though the controller costs are falling rapidly, there remains the cost of the engine driven power source, both in dollars and lost power, and reliability.

It is an object of the present invention to overcome or ameliorate one or more of the disadvantages of the prior art, or at least to provide a useful alternative.

DISCLOSURE OF THE INVENTION

Accordingly, the invention provides a suspension system for a vehicle of the type having a body and at least four wheels independently supported for movement between upper and lower positions relative to the body, said suspension system including:

a balance mechanism including first and second balance members adapted to support suspension forces in the vehicle;

a plurality of actuating elements responsive respectively to the positions of the wheels relative to the body, a first pair of said actuating elements being operable on spaced apart points on the first balance member and a second pair of said actuating elements being operable on spaced apart points on the second balance member;

first control means for controlling relative movement between the first and second balance members of the balance mechanism;

and second control means for controlling relative movement between the balance mechanism and the body;

the first and second control means acting in combination to redistribute suspension forces between the body and the wheels, thereby to induce predetermined suspension behaviour.

Advantageously, the effective separation between the balance mechanism and the body means that there is no inherent requirement for interdependence or direct interaction between any of the four primary suspension modes of pitch, roll, twist and bounce. Consequently, these modes may be isolated and controlled substantially independently or linked in any desired combination.

Preferably, the first and second balance members are arranged such that, in the absence of supplementary suspension elements such as springs and dampers, the suspension forces applied to each of the balance members are distributed by the first control means in predetermined proportions between the associated wheels, substantially independently of the positions of the wheels relative to the body. In other words, the first control means can be configured to redistribute suspension forces between the body and the wheels, directly in response to the suspension forces acting on the wheels, largely irrespective of the extent of suspension travel within predetermined limits.

In preferred embodiments, the balance mechanism, at least to a reasonable approximation, "floats" relative to the body. Preferably also, the balance mechanism is arranged such that each mode of suspension movement tends to induce movement of the balance mechanism along or about a unique axis, thereby facilitating resolution of the suspension forces and independent control over the respective modes.

Preferably, the second control means is provided in the form of an elastic member interposed between the balance mechanism and a support frame or housing fixed to the body of the vehicle. More preferably, the second control means is elastically deformed only when the balance mechanism moves along or about one of the unique axes that is associated with either the bounce, pitch, roll or twist modal movements of the suspension. In this way, the second control means only reacts to the suspension movements of the mode uniquely associated with it and is unaffected by any of the other modal movements.

In the preferred embodiment, the balance members take the form of mechanical linkages. It will be appreciated, however, that in other embodiments hydraulic, pneumatic, electromagnetic or other forms of linkage may alternatively be used.

Preferably, the first control means include a mechanical linkage connecting the balance members. More preferably, the mechanical linkage is a fixed linkage and operates by resisting relative movement between the balance members.

More preferably, the first and second balance members, together with the first control means, are integrally formed as a single unitary balance mechanism. More preferably, the balance mechanism in this embodiment is formed as an "X"-shaped plate, with the first and second balance members effectively forming the respective diagonal "arms" of the X, and the first control means forming the substantially rigid interconnection therebetween. Of course, the plate could in practice be any physical shape. However, it can be considered at a conceptual level as an "X" by virtue of the manner in which the suspension forces are transferred within it.

In this way, the first control means simply functions to provide inherent resistance to relative movement between the balance members. In this embodiment, although independent relative movement between the balance members is not possible to a significant degree, some relative movement may be accommodated, if desired, by elastic deformation of the balancing plate itself. In this case, the extent of resilient deformation within the balance plate is an important design parameter in the context of the desired handling characteristics of the vehicle.

Preferably, the system includes four primary actuating elements connected proximally to the respective wheels, and four secondary actuating elements remote from the wheels and operable directly on the balance mechanism, the primary actuating elements being linked to respective secondary actuating elements by connecting means.

In one embodiment, the primary and secondary actuators include hydraulic cylinders. In an alternative embodiment, the primary and secondary actuators include mechanical linkage mechanisms, or lever arms. In a further variation, the primary and secondary actuators include a combination of hydraulic cylinders and mechanical linkages. Other forms of actuators are also envisaged including position transducers, potentiometers, pneumatic cylinders, electric motors, pressure switches, and the like. The connecting means may include hydraulic or pneumatic fluid lines or couplings, mechanical linkages, electromagnetic connections or other suitable means.

In some preferred embodiments, the connecting means permit the primary actuators at one end of the vehicle to be connected to the secondary actuators on the same end but on the opposite side of the balance mechanism, while the primary actuator associated with each of the wheels at the other end of the vehicle is connected respectively to the secondary actuator operable on the same end and on the same side of the balance mechanism.

In some embodiments, the primary and secondary actuating elements may be fixedly interconnected, or may be integrally formed.

In one preferred embodiment of the invention, suitable for use with a typical front wheel drive car, the primary and secondary actuators for each of the front wheels are hydraulic rams and are interconnected by hydraulic fluid lines. The ram for each front wheel is preferably connected with the secondary actuator on the opposite side. The primary actuators for the rear wheels, in the form of trailing arms, are preferably connected directly to their respective corners of the balance mechanism by means of respective secondary actuators in the form of ball joints. A support frame, affixed to the body, preferably carries a coil spring which acts on the balance mechanism to distribute the weight of the vehicle amongst the four wheels in a predetermined ratio. Preferably, the same support frame also carries a torsion bar, the ends of which are attached to the front and rear of the balance mechanism for moderating pitch during acceleration and braking.

Another embodiment may advantageously be used with a luxury sedan or the like wherein the front primary actuators are respectively connected to opposed corners of the balance mechanism by hydraulic means. The rear primary actuators are preferably connected to their respective secondary actuators, also by hydraulic means. The first control means acting between the balance mechanism and the body is preferably provided in the form of a longitudinally spaced pair of air springs whereby the pressure of air in the springs is dependent upon vertical displacement of the front and back of the car. This arrangement of air springs acts to support the vehicle at a constant ride height and also acts to moderate pitch during acceleration and braking.

Another embodiment is preferred for use in a racing car. In this case, ride height control means are provided in the form of a ball joint between the balance mechanism and a support frame fixed to the chassis. In this case, anti-pitch control means are preferably provided in the form of a pair of longitudinally spaced apart springs acting on the balance mechanism. These springs are preferably pre-loaded against stops to provide a predetermined response to harsh bumps once the threshold preload force is overcome whilst minimising pitch during normal acceleration and braking.

Another preferred embodiment, suitable for use in a low cost car, uses mechanical pull rods, acting between the wheel control arms and the balance mechanism, as the primary and secondary actuators. Control means for the balance mechanism are preferably provided by two telescopic dampers and a single coil spring.

In another prefered form, suitable for use in a four wheel drive vehicle, mechanical pushrods transmit the wheel loads from the wheel control arms to the balance mechanism. Control means for the balance mechanism are preferably provided by two opposed spring damper units.

Throughout the description and claims, the words "control", "controlled", "controlling", "control means" and the like are intended to be interpreted in a broad sense and to include, by way of example, apparatus or systems incorporating control means which are active or passive, direct or indirect, positive or resistive, movable or fixed, proportional or disproportional, digital or analogue, integral or discrete, mechanical, hydraulic, pneumatic, electromechanical, magnetic or optical.

BRIEF DESCRIPTION OF THE DRAWINGS

Preferred embodiments of the invention will now be described, by way of example only, with reference to the accompanying drawings, in which:

FIGS. 3a to 3d show four modes; bounce, pitch roll and twist respectively of a vehicle suspension;

FIG. 14b is a partially cut away enlarged view showing part of the suspension system of FIG. 14a;

FIG. 14c shows a number of force-displacement curves illustrating the performance of the system of FIG. 14a;

FIG. 18b is a cross-sectional view showing part of the suspension system of FIG. 18a;

FIG. 18c shows a number of force-displacement curves illustrating the performance of the system of FIG. 18a;

FIG. 19b shows a number of force displacement curves illustrating the performance of the system of FIG. 19a;

FIG. 20b shows an enlarged view of part of the system of FIG. 20a;

FIG. 20c shows a number of force-displacement curves illustrating the performance of the system of FIG. 20a;

PREFERRED EMBODIMENTS OF THE INVENTION

FIGS. 1 to 7 illustrate aspects of the prior art that were covered in the introduction by way of background information.

FIGS. 8, 9, 10 and 11 show conceptually four suspension systems that could be used to control each of the four primary degrees of freedom of suspension movement experienced by a vehicle. Such a vehicle would typically have four wheels, each wheel being independently supported for movement between upper and lower positions with respect to the vehicle body.

FIGS. 8, 9, 10 and 11 show simplified depictions of four functionally separate systems. However, it should be understood that all four systems or various combinations thereof can be integrated to provide a complete suspension system according to the invention (one way of performing this integration is shown later in FIG. 12). These arrangements are shown as essentially two-dimensional mechanisms with the aim of simplifying and generalising the relevant concepts.

Figure 1:
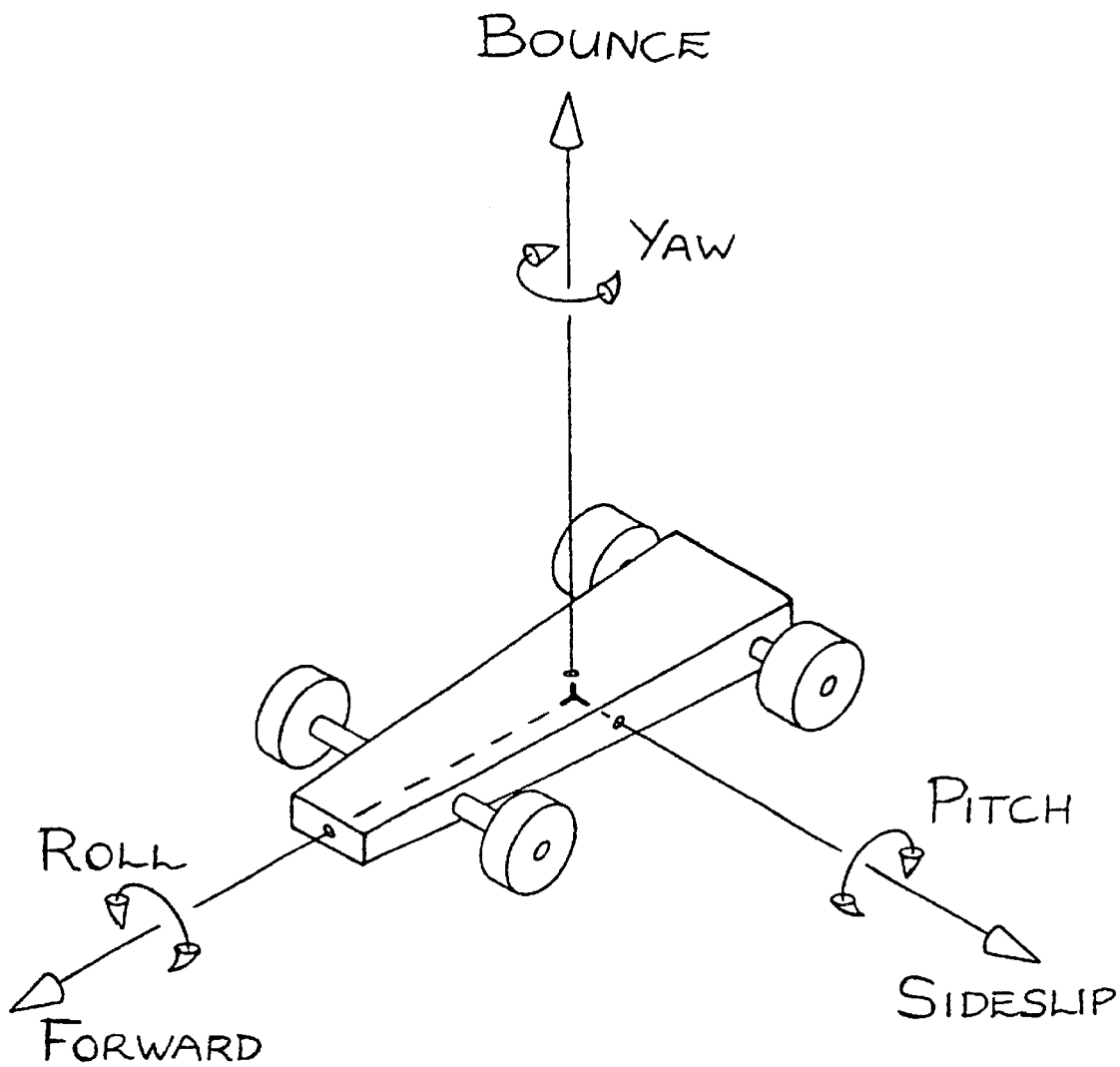
FIG. 1 shows the six modes of movement of a vehicle with respect to the ground.
Figure 2:
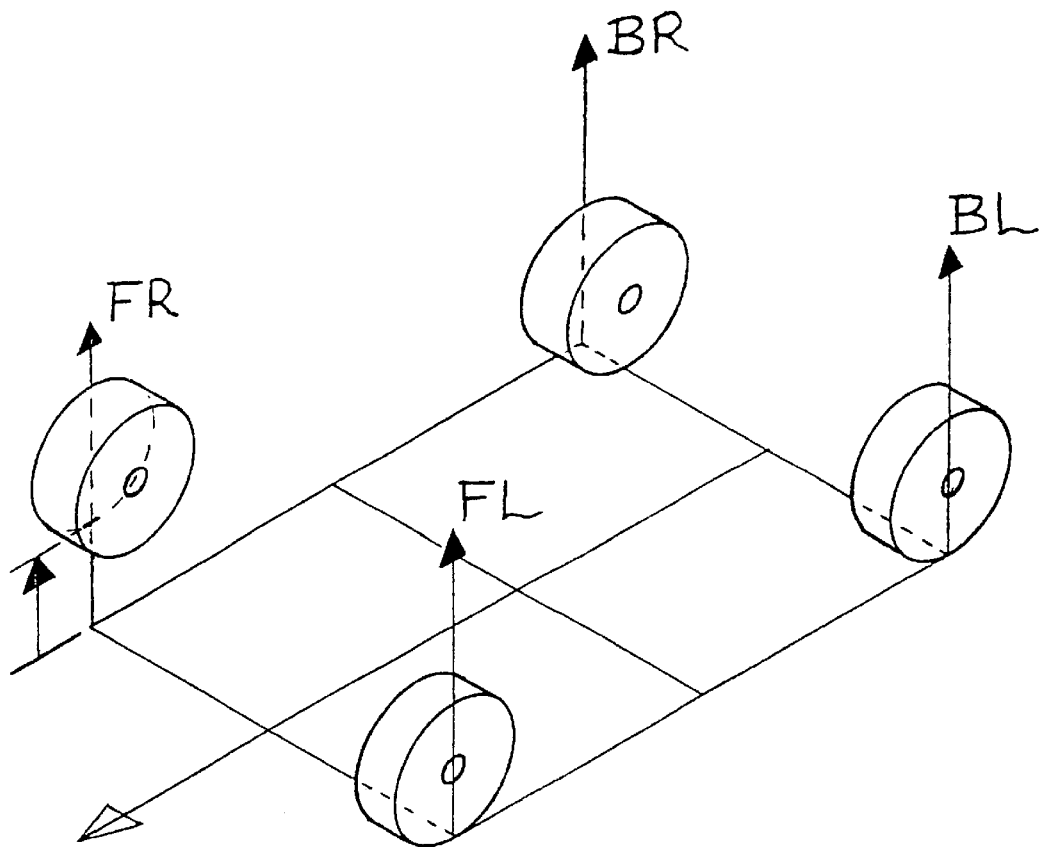
FIG. 2 shows a method of specifying the position of each of four wheelprints with respect to a vehicle body.
Figure 4:
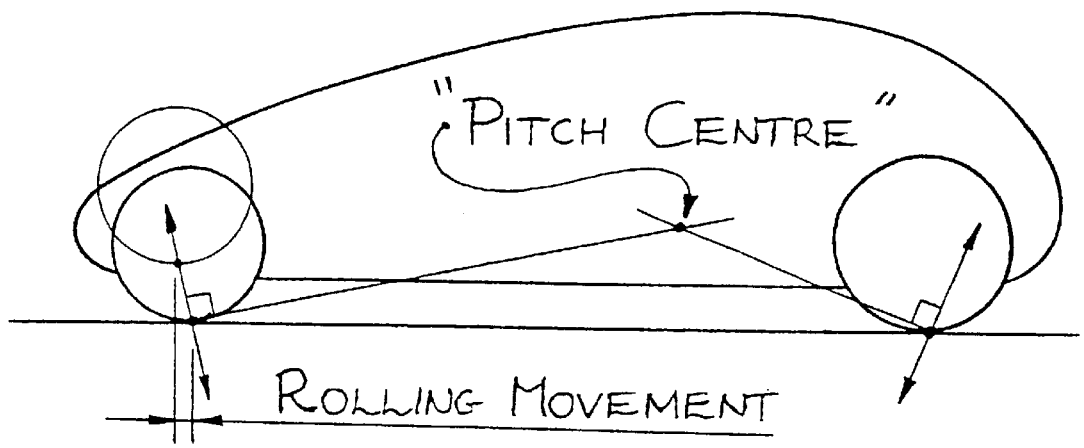
FIG. 4 shows a method of determining the "pitch centre" of a vehicle.
Figure 5:
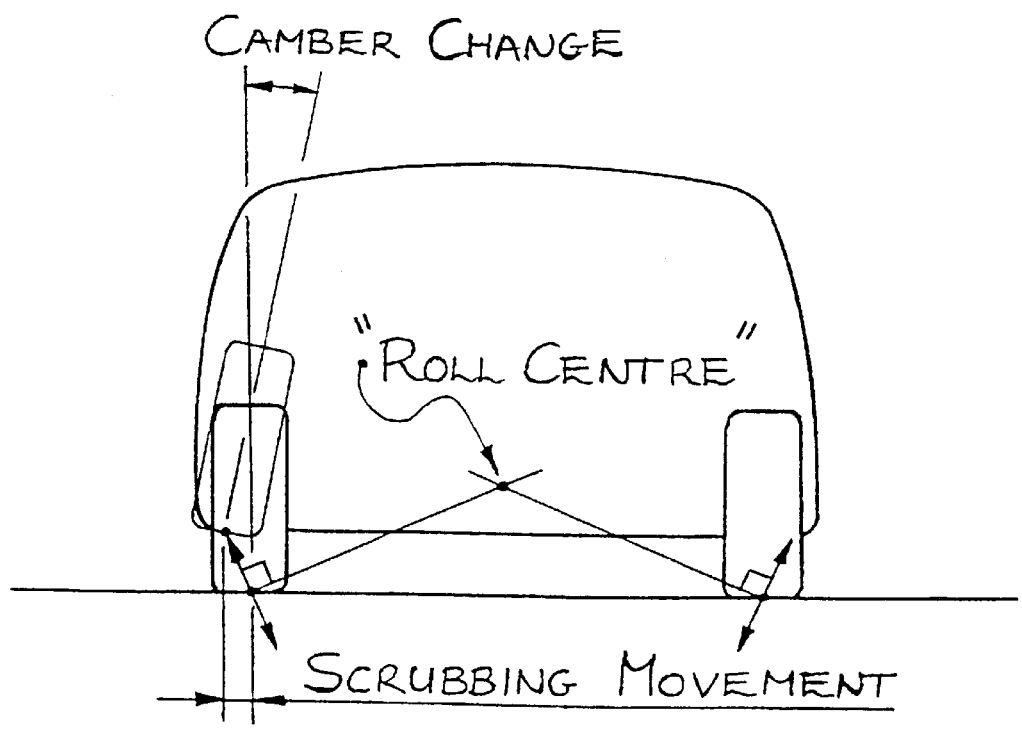
FIG. 5 shows a method of determining the "roll centre" of a vehicle.
Figure 6:
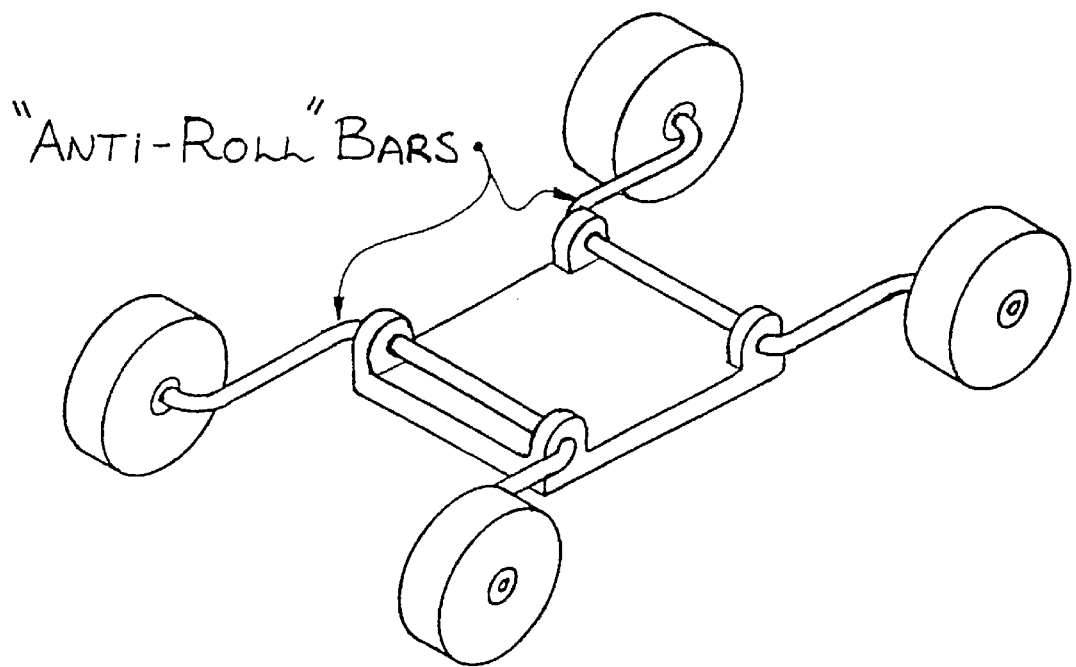
FIG. 6 shows a prior art suspension system.
Figure 7:
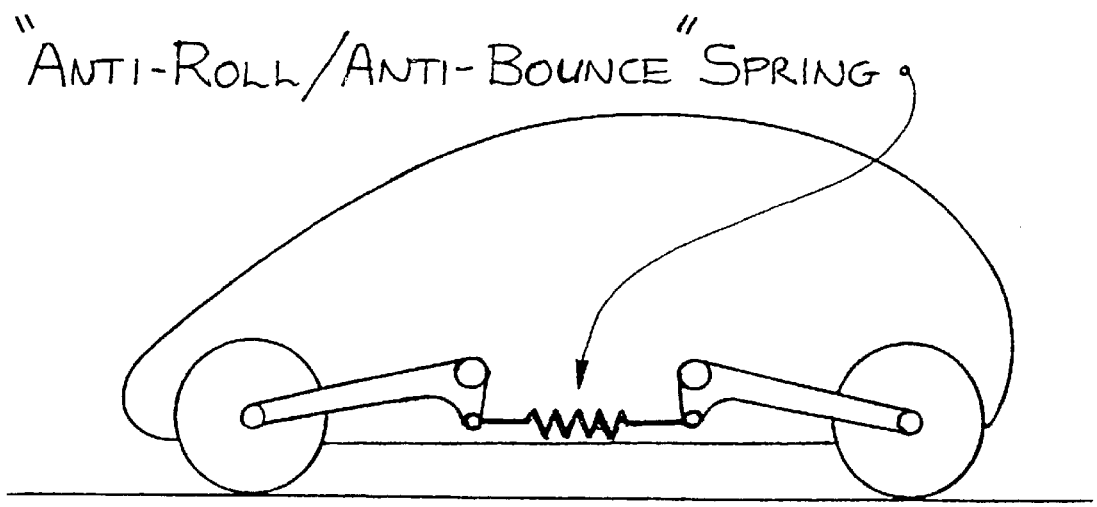
FIG. 7 shows another prior art suspension system.
Figure 8:
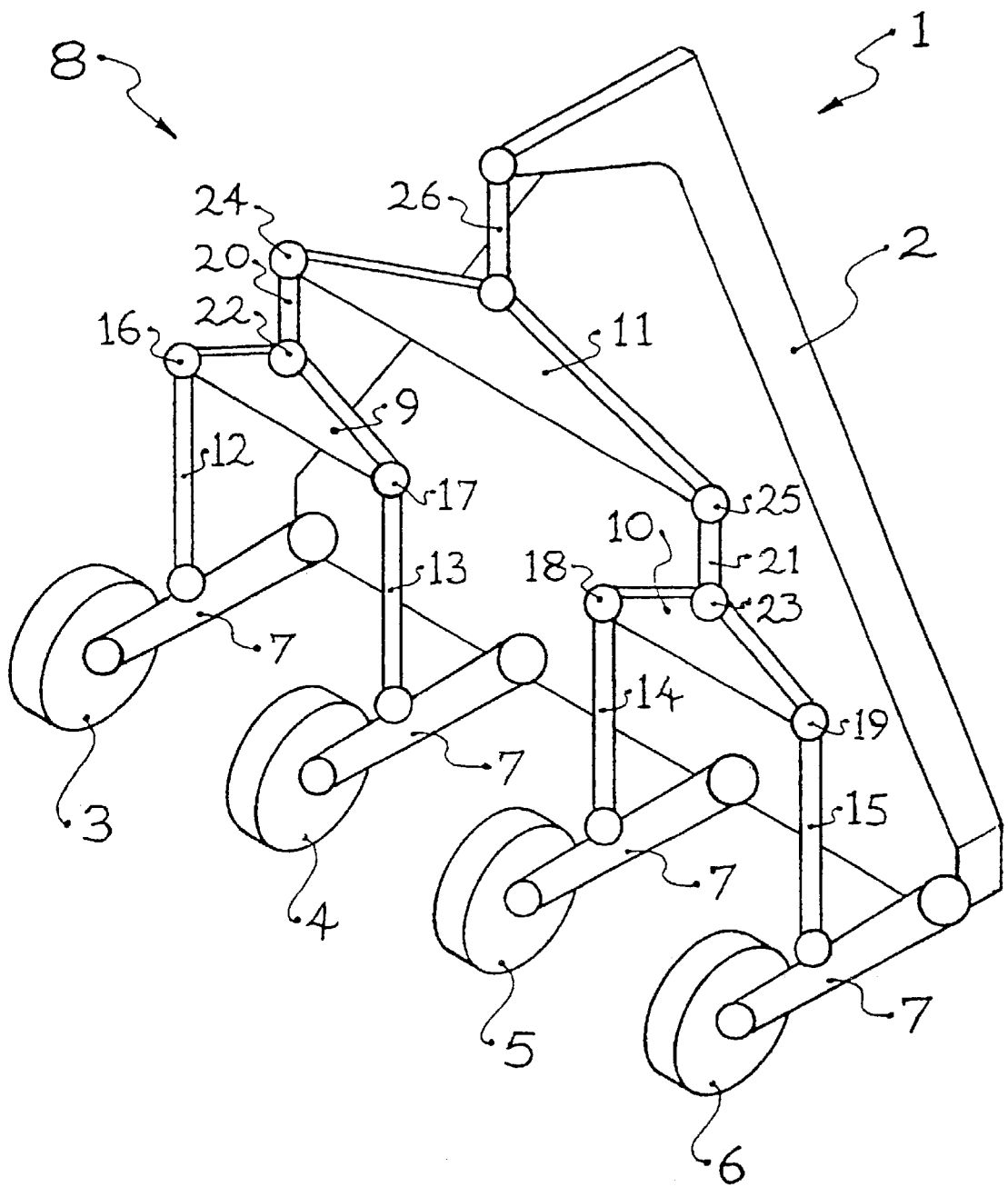
FIGS. 8, 9, 10 and 11 show the major subsystems of a first conceptual embodiment of a suspension system according to the present invention.

FIG. 8 shows a vehicle 1 having a body 2 and four wheels 3, 4, 5 and 6. The wheels are connected to the body via control arms 7 which allow independent movement of each wheel between upper and lower positions. The system includes a balancing mechanism 8 which includes first, second and third balance members 9, 10 and 11 adapted to support the suspension forces of the vehicle. The system also includes a plurality of actuating elements 12, 13, 14 and 15 responsive respectively to the positions of the wheels relative to the body. A first pair of actuating elements 12 and 13 are pivotably attached at their upper ends, to spaced apart points 16 and 17 on the first balance member 9. Similarly, a second pair of actuating elements 14 and 15 are pivotably attached at their upper ends, to spaced apart points 18 and 19 on the second balance member 10. The system also includes a pair of links 20 and 21 which are pivotably attached at their lower ends to the respective fulcrum points 22 and 23 of balance members 9 and 10, and pivotably attached at their upper ends to spaced apart points 24 and 25 on the third balance member 11. Finally, the system has a link 26 which is pivotably attached at its lower end to the fulcrum point of balance member 11, and is attached at its upper end to the vehicle body 2.

It will be appreciated, when viewing FIG. 8, that any vertical force acting downwardly through link 26 will be distributed to the four wheels via the balance mechanism 8. This vertical force would typically include weight of the vehicle body 2, the weight of any payload being carried by the vehicle, any vertical inertial loads of the body and its payload, and any vertical aerodynamic loads acting on the vehicle body. The vertical force at link 26 will firstly be distributed by balance member 11, in predetermined proportions, to balance members 9 and 10. Secondly, balance members 9 and 10 will respectively distribute their shares of the vertical force, in predetermined proportions, to wheels 3 and 4, and 5 and 6. More specifically, the balance members distribute the force acting at their fulcrum point, to their effective end points, in a ratio determined by the relative distances between fulcrum point and end points. These distances can be fixed during manufacture or may be adjustable to facilitate suspension tuning.

It will also be apparent that the distribution of forces by the balance members occurs substantially independently of the vertical positions of the wheels relative to the body, being determined solely by the geometry of the balance members themselves. This contrasts fundamentally with conventional sprung suspension systems, where suspension forces are determined by the vertical positions of the wheels as the associated springs are extended or compressed and by the rate of vertical movement of the wheels, in response to the associated dampers.

Figure 9:
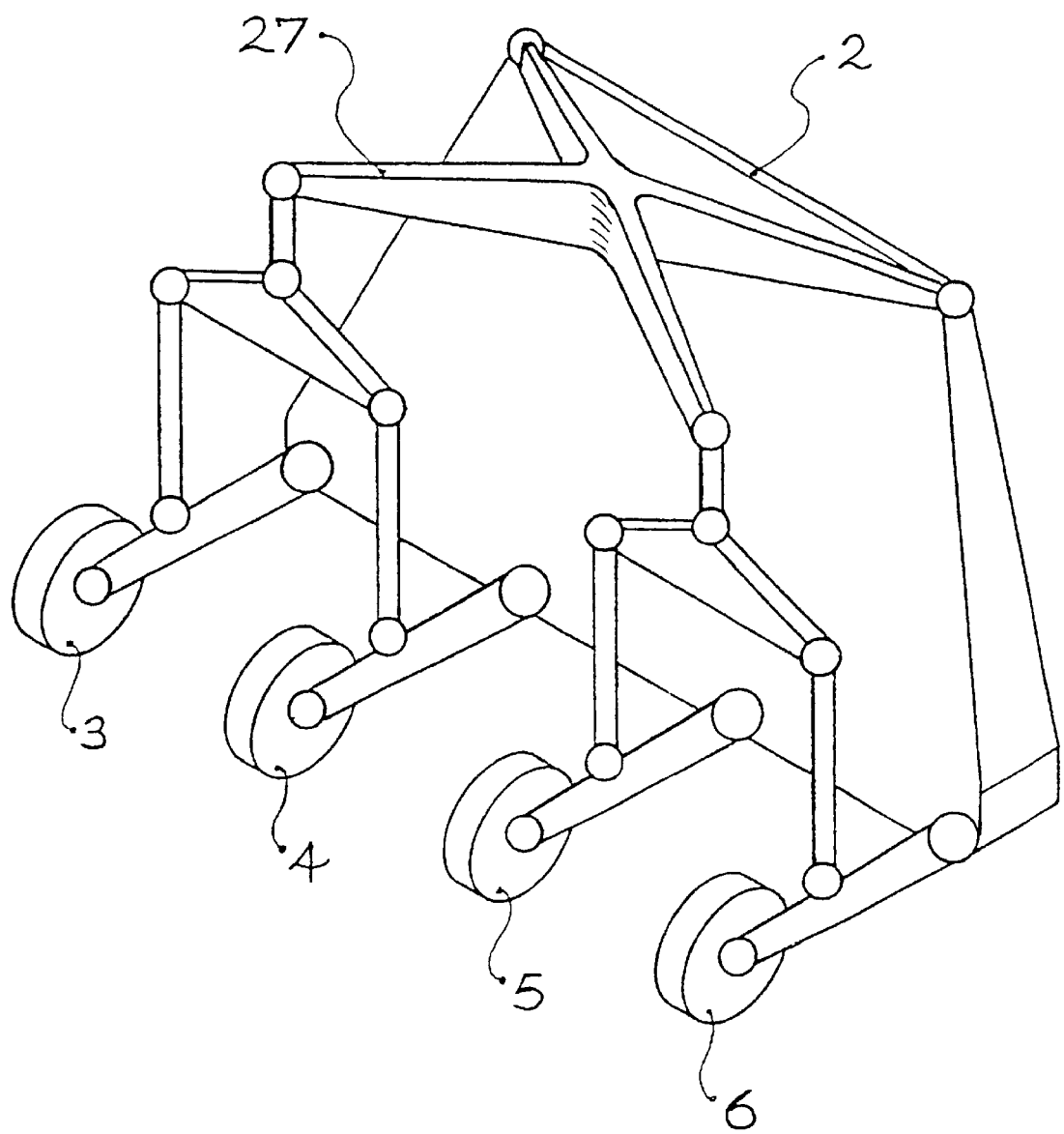
Figure 10:
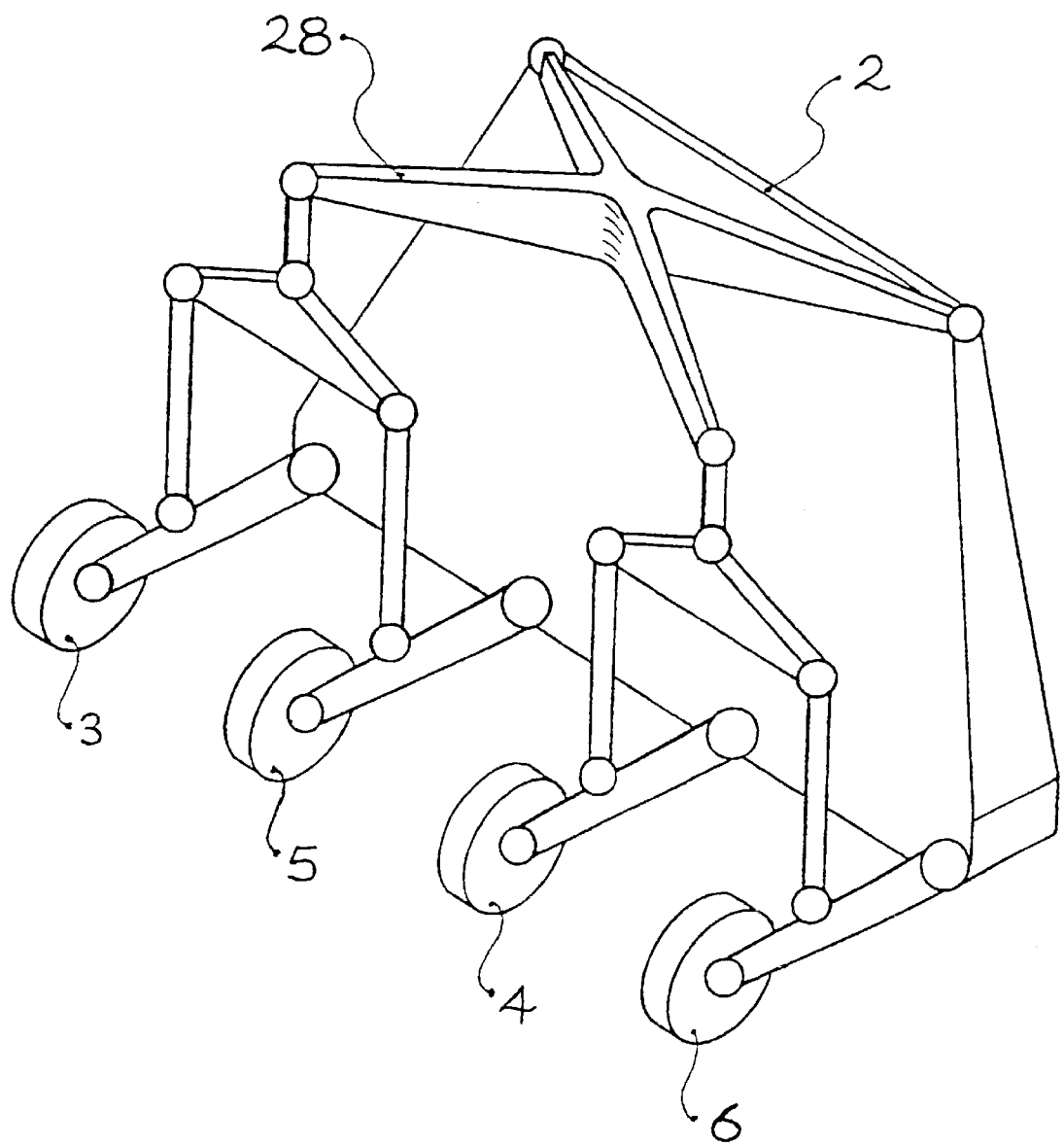
Figure 11:
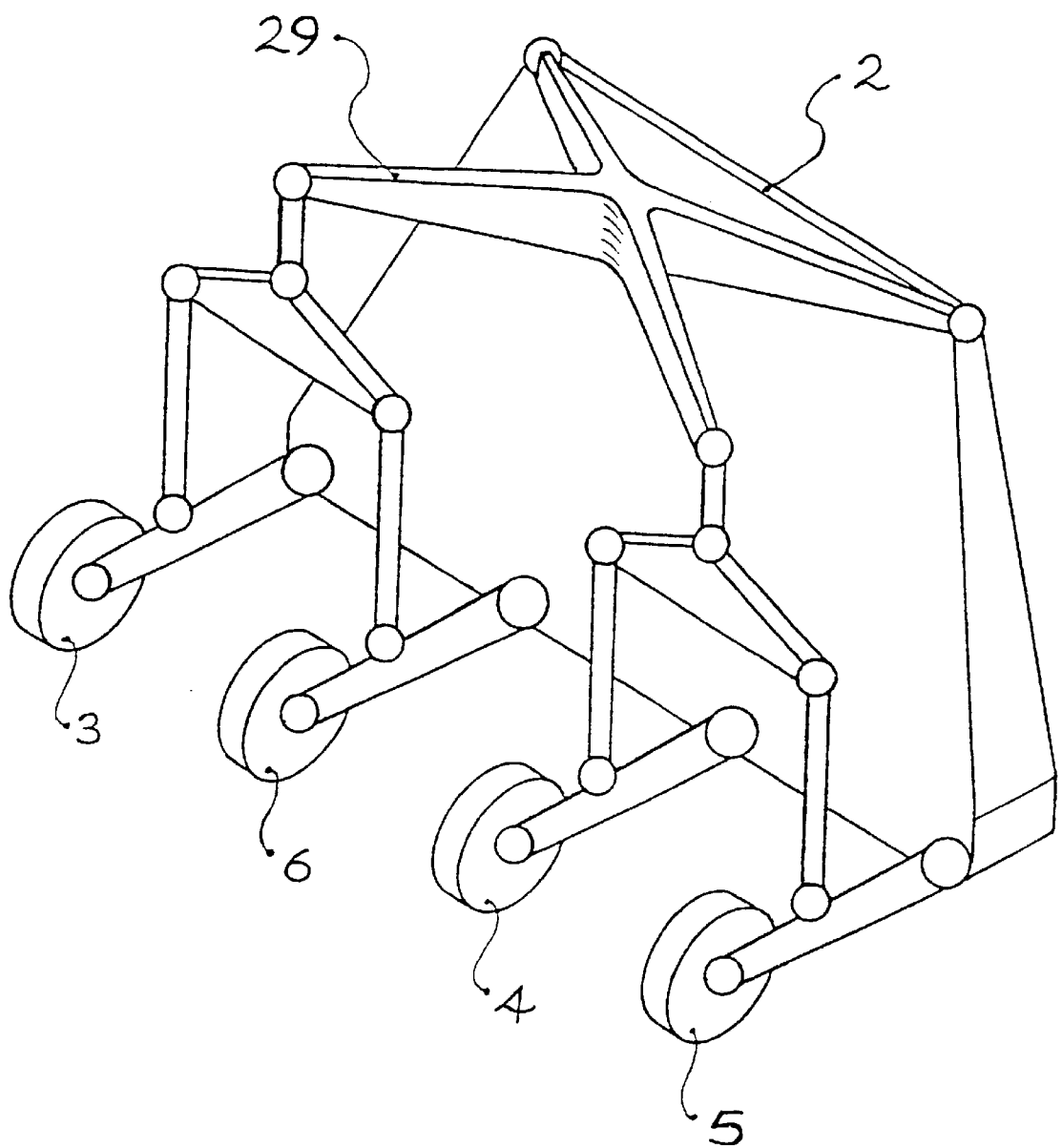

FIGS. 9, 10 and 11 show conceptually three further systems that can be combined with the system of FIG. 8 in any permutation or combination to form a suspension system which can be designed independently to control each of the four modes of suspension or any combination thereof. The systems in FIGS. 9, 10 and 11 differ from the system in FIG. 8 in that the balance member 11 of FIG. 8 is replaced by torque members 27, 28 and 29 in FIGS. 9, 10 and 11 respectively. These torque members are pivotably attached at one end to the vehicle body 2, and are pivotably attached at their other end to first and second balance members which are similar to, but distinct from, balance members 9 and 10 of FIG. 8.

It will be readily appreciated that due to the generally horizontal orientation of the torque members, and due to their pivotal attachment to the body at one end, and to the first and second balance members at the other end, they cannot transmit any vertical forces from the vehicle body 2 to the first and second balance members and thence to the wheels. In other words, no nett vertical force acting between the body 2 and the wheels 3, 4, 5 and 6 can be transmitted through the balance mechanisms of FIGS. 9, 10 and 11. However, any twisting moment that acts on the body 2, in the plane of the essentially two-dimensional mechanism, will be transmitted by the torque member from the body to the first and second balance members. As a result, the fulcrum point of one balance member will experience an upwardly directed force and the fulcrum point of the other balance member will experience an equal but downwardly directed force. These vertical forces will then be distributed by the first and second balance members, in predetermined proportions, to their respective wheels as described previously with reference to FIG. 8.

Again, it will be appreciated that the distribution of these forces occurs substantially independently of the vertical positions of the wheels relative to the body, and is determined solely by the geometry of the balance members themselves.

The only essential difference between FIGS. 9, 10 and 11 is that each figure shows a different pairing of wheels to the first and second balance members. There are three, and only three, different ways of taking two pairs of items from a set of four, and thus FIGS. 9, 10 and 11 depict each pairing alternative. Torque members 27, 28 and 29 each act between two pairs of wheels that are different to the pairings of the other torque members, and there are no other possible pairings that can be taken from the given set of four wheels.

If FIGS. 8, 9, 10 and 11 are considered as separate subsystems of a single suspension system, it may be seen that the subsystem of FIG. 8 is responsible for transmitting any nett vertical forces between the vehicle body and the four wheels. These forces are distributed amongst the wheels in proportions determined by the dimensional parameters of the balance members of FIG. 8, and are substantially independent of the vertical positions of the wheels. The subsystems of FIGS. 9, 10 and 11 are responsible for transmitting any roll or pitch moments acting on the vehicle body, to the four wheels. They do this by reducing the vertical load on one pair of wheels, and increasing the vertical load, by an equal amount, on the other pair of wheels. Again, the distribution of this transferred load between the two wheels in a pair is determined by the dimensional parameters of the balance member that is linked to that pair of wheels, and not by the relative vertical displacements of the two wheels in the pair.

In summary, the functions of the respective subsystems are as follows. The system of FIG. 8 distributes all vertical loads from the vehicle body to the wheels, and resists none of the roll or pitch moments acting on the body. The systems of FIGS. 9, 10 and 11 distribute all roll and pitch moments of force acting on the vehicle body as a variation in loading between all possible combinations of wheel pairings, but are incapable of causing any nett change in total wheel loading. As the only motions of the vehicle body that directly cause vertical suspension movement are bounce, pitch, twist and roll it will be appreciated that these subsystems, when combined, can provide full independent control over relative movement between the vehicle body and the ground, and also between the vehicle body and the wheels. How this is done in practice will become clearer in light of the discussion which follows.

If the actuating links 12, 13, 14 and 15 shown in FIG. 8, were not pivotally attached directly to the wheel axle, but attached some way along the wheel control arms 7 as shown, then the combination of an upward applied force to the wheel and a downward force upon the actuating element would cause the wheel control arm to exert a downward force on the body 2. This leverage effect would consequently increase the forces in the links, actuating elements, balance members, torque members and wheel control arms. However, the distribution of vertical loads and moments acting between the vehicle body and the wheels, would remain essentially as described above, and be determined only by the dimensional parameters of the various balance members, and not by the vertical displacement of the wheels.

Examples of links and actuating elements that might be used in FIGS. 8, 9, 10 and 11 include, but are not limited to, mechanical pushrods and pullrods, and hydraulic rams connected by hydraulic tubing.

The links, actuating members, balance members, torque members and wheel control arms can be rigid or they can be designed to flex to provide springing which can be of a constant or variable rate. The motion of the wheels, the sprung mass, links, actuating members, balance members, torque members or wheel control arms can be controlled by separate dampers or the damping can be built into any of the links, actuating members, balance members, torque members or wheel control arms.

The links, balance members, torque members, wheel control arms and joints shown separately in FIGS. 8, 9, 10 and 11 may be implemented as separate parts. Alternatively, some of them may be combined into a unified three-dimensional part such that their role of distributing the forces remains as shown in FIGS. 8, 9, 10 and 11 and is not adversely affected by the motions of the other members and links that are incorporated into the same unified part.

Figure 12:
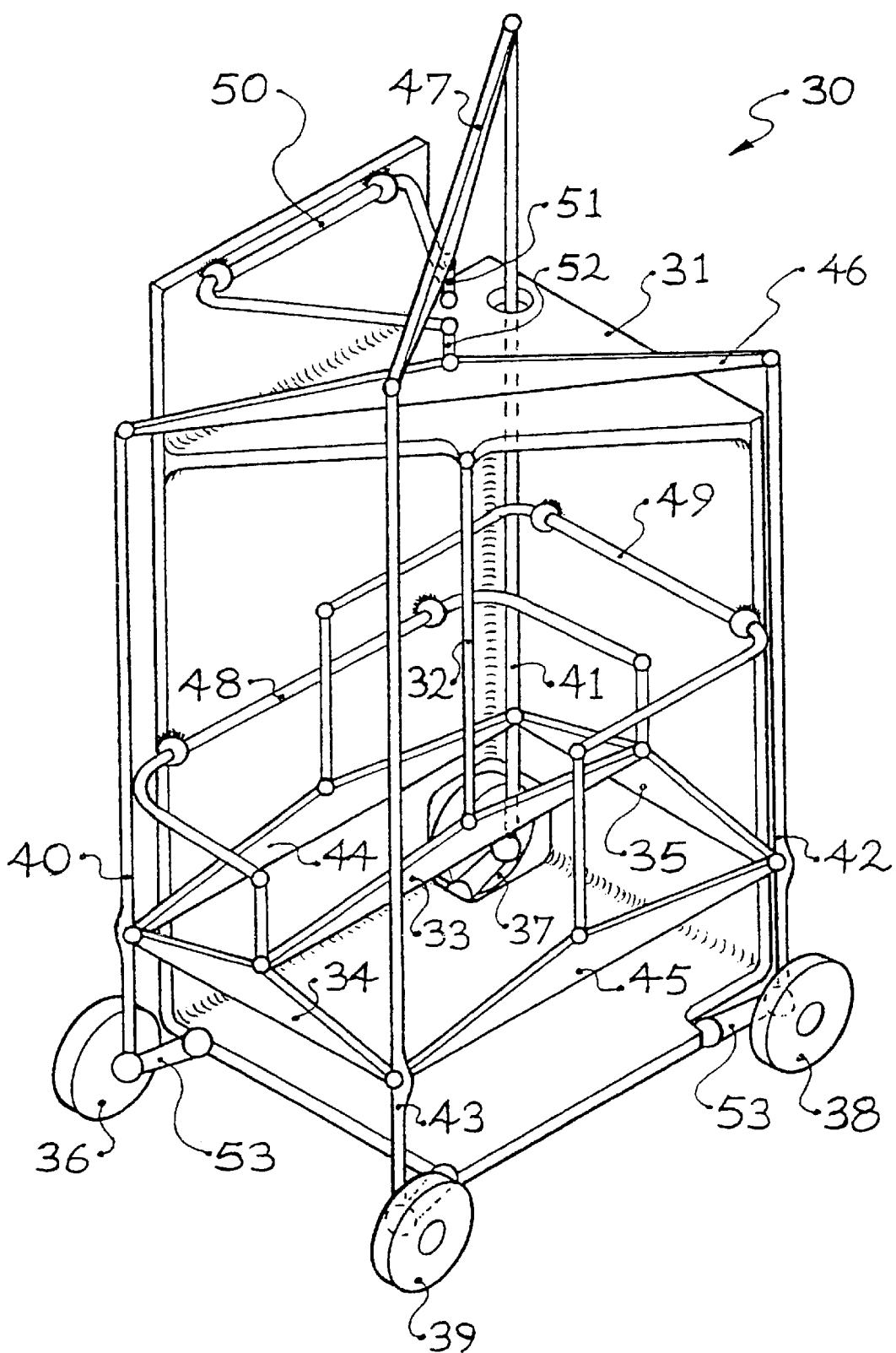
FIG. 12 shows a second conceptual embodiment of the suspension system according to the invention.

FIG. 12 depicts a conceptual embodiment of the balanced suspension system 30 that illustrates how the conceptual systems of FIGS. 8, 9, 10 and 11 can be combined to form a composite suspension system for a vehicle with wheels laid out in a rectangular pattern. The system shown in FIG. 12 may be impractical in some respects but serves to illustrate conceptually some relevant features of the invention. The body 31 is joined to link 32 which serves as the main support for the weight of the body. The lower end of link 32 joins balance member 33 which distributes the body's weight to balance members 34 and 35 and thence to the wheels 36, 37, 38 and 39 via respective actuating members 40, 41, 42 and 43. Members 33 and 34 and members 33 and 35 are joined pivotably together with ball joints at the ends of member 33. Two more balance members, 44 and 45, are similarly joined between the ends of members 34 and 35. Finally, balance member 46 is joined at its ends to actuating members 40 and 42 and balance member 47 is joined at its ends to actuating members 41 and 43. The fulcrum joints of 34 and 35 are linked to torque member 48, the fulcrum joints of members 44 and 45 are similarly linked to torque member 49, and fulcrum joints of 46 and 47 are linked to torque member 50 via links 51 and 52. Torque members 48, 49 and 50 are shown here as relatively flexible "U-bars" rather than the more rigid "X-bars" shown in FIGS. 9, 10 and 11.

A closer look at FIG. 12 reveals the following properties of the suspension system. The wheel control arms 53 transmit none of the vertical forces from the wheels to the body so the forces in the actuating members 40 to 43 are equal to the vertical forces acting on the corresponding wheels. The link 32 is the sole support for the weight of the body and accordingly, if the balance members and other links are relatively rigid then the bounce mode spring rate is equal to the axial spring rate of link 32. If the four wheels are in a rectangular pattern and the longitudinal axis of the car is parallel to 33 then only torque member 48 can resist pitch moments acting on the body 31. Accordingly, the pitch mode spring rate will be determined by the spring rate of torque member 48. Similarly, the roll mode spring rate will be determined by the spring rate of torque member 49. If the fulcrum joints of balance members 46 and 47 are vertically aligned, then links 51 and 52 would be coaxial. Therefore no torque could be exerted on the body 31 by torque member 50, making its connection to the body redundant. Accordingly, the twist mode spring rate would be set by the spring rate of member 50. Furthermore, it can be seen that torque member 50, and the twist mode in general offers no resistance to roll or pitch moments. Consequently, torque member 50 cannot be used to control the motion of the body. Of course, each of the above spring rates could also include a damping function if desired.

If any of the actuating members 40 to 43 were joined to the wheel control arms 53 at any point other than the wheel axle, then a proportion of the vertical force acting on the wheel would act at the joint between the wheel control arm 53 and the body. The modal spring rates mentioned above would then have to be adjusted according to the leverage ratio of the wheel control arms. However, the distribution of the body forces and moments to the wheels would remain as explained above.

The above analysis shows that the spring-damping rates for the suspension modes of bounce, pitch, roll and twist can be separated, with each mode being independently controlled by its own spring-damper member. For example, if torque member 49 is designed as a relatively stiff structure and members 46, 47, 50, 51 and 52 are removed, then the system 30 will have a high roll stiffness, very low twist stiffness, and bounce and pitch rates determined by link 32 and torque member 48. If fitted to a car with ground level roll centres and soft spring rates for link 32 and torque member 48, this system would result in a comfortable ride over bumps with very little roll during cornering and good grip since all wheels would remain in contact with the uneven ground surface at all times. The operational benefits of the suspension system will become apparent in light of further explanation provided below.

Furthermore it can be seen that any sprung mass roll moment forces acting on the body are distributed between the front and rear wheels in a ratio determined by the position of the fulcrum joints of balance members 44 and 45. By adjusting the longitudinal position of these joints the handling balance can be varied between understeer and oversteer.

The system shown in FIG. 12 may be impractical because it requires the forces from the four wheels to be transmitted to the body at link 32 and torque members 48 and 49 via extensive mechanical linkages. This is by no means impossible but there may be practical problems in packaging such a linkage in the volume shared by passengers, engines, drivetrains and so on.

Figure 13:
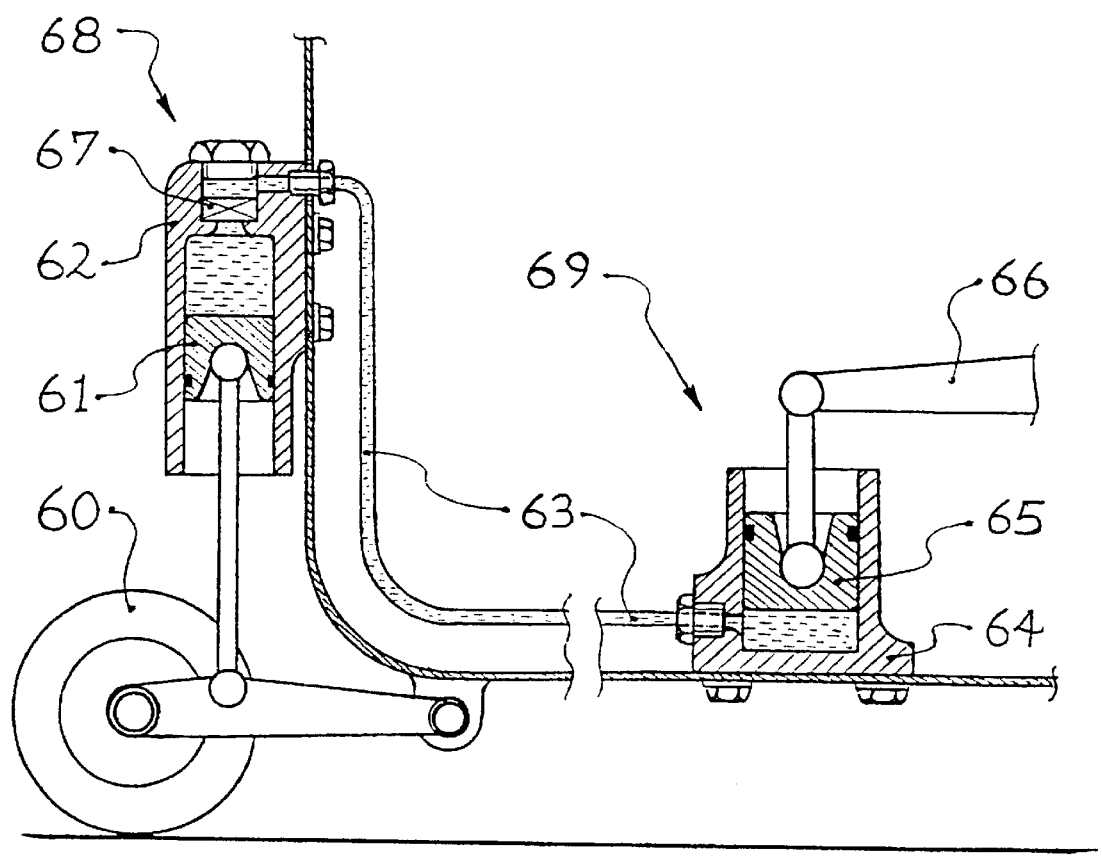
FIG. 13 is a cross-sectional view of a hydraulic linkage for use in a suspension system according to the invention.

In order to address these difficulties, FIG. 13 shows an hydraulic linkage between a primary actuator 68 proximal to the corresponding wheels, and a secondary remote actuator 69. Upward movement of the wheel 60 forces piston 61 upwardly inside the cylinder 62 of primary actuator 68 which forces the hydraulic fluid out of cylinder 62, through the hydraulic line 63 and into cylinder 64, which in turn forces piston 65 upwards. The mechanical link 66 joined to the piston 65 then transmits the force to the balance and torque members. This arrangement thus allows greater flexibility of layout.

There are two main advantages in using hydraulic links. Firstly, cylinder 62 can be located close to the wheel, typically where a normal spring-damper would be situated, while cylinder 64 and the balance and torque members can be mounted in whatever remote location is most convenient. The hydraulic tubing 63 that connects the two cylinders 62 and 64 is relatively inexpensive, easy to route and non-intrusive compared with a mechanical linkage. Secondly, some kind of damper must be fitted to any suspension if spring-mass oscillations are to be avoided. To this end, hydraulic damper valving 67, similar in operation to the valves in conventional dampers, can easily be incorporated to the hydraulic links. The system shown in FIG. 13 makes an excellent damper because the fluid is pressurised by the weight of the car and only two seals are required, compared with three seals for a functionally equivalent "monotube" gas pressurised damper.

If the hydraulic links are used as dampers then the damping is a function of the individual wheel motions rather than being separated into the modal motions. Extra damping can be applied at the mode controlling springs if necessary. However, as there is a certain amount of undamped spring in the tyres, it may be more effective and economical to do most of the damping as close to the wheels as possible.

Figure 14A:
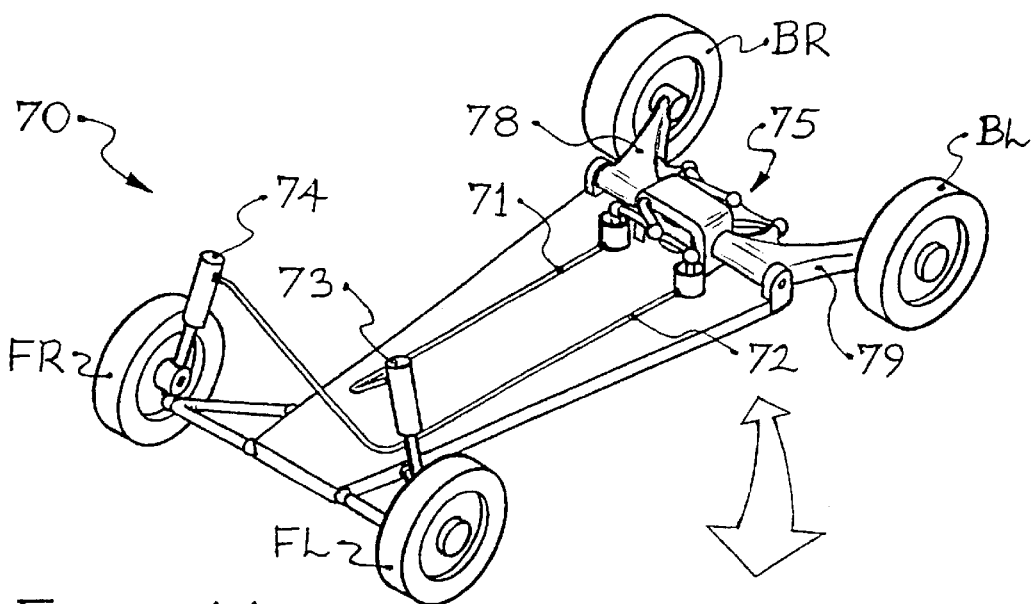
FIG. 14a shows a more practical embodiment of the suspension system according to the invention.
Figure 14B:
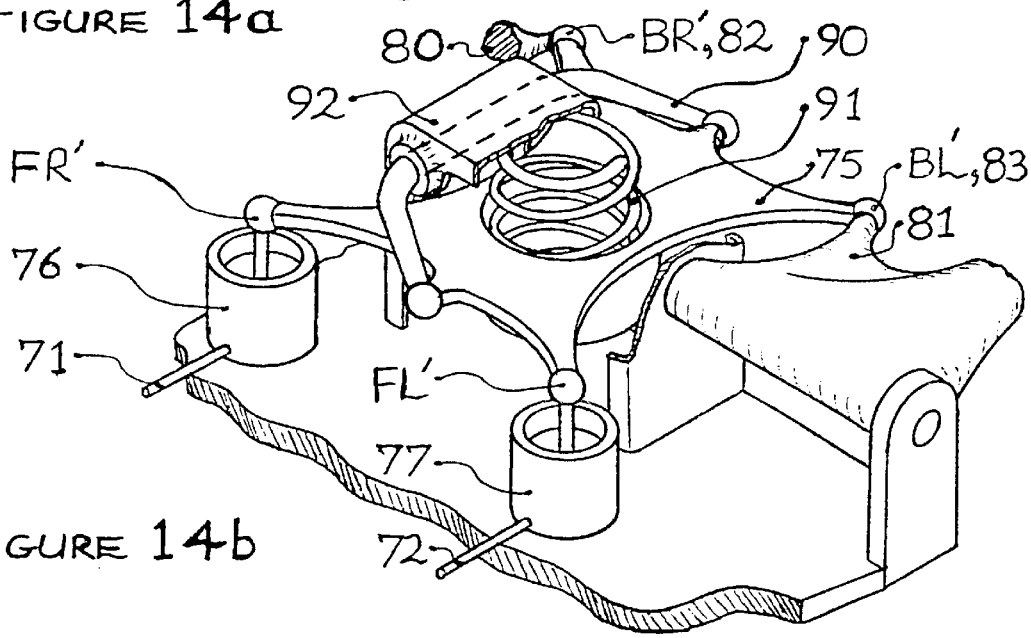

FIG. 14 shows a suspension system 70, applied to a typical front wheel drive car. The system uses two hydraulic links 71 and 72 with built in damping to connect the front primary hydraulic actuators 73 and 74 to the balance mechanism 75, in the form of a generally rectangular floating balance plate, via secondary hydraulic actuators 76 and 77. By contrast, the rear trailing arms 78 and 79 are connected mechanically to the balance mechanism via levers 80 and 81 which act on the balance mechanism through ball joints 82 and 83. Separate telescopic dampers (not shown) are provided for each rear wheel. This system is shown to illustrate that hydraulic and mechanical links can be used in the same system.

For clarity, the wheels are denoted as front right (FR), front left (FL), back right (BR), and back left (BL). The corresponding points of the generally X-shaped integrated balance mechanism are denoted FR', FL', BR' and BL'. The front wheels FR and FL are attached to the body via respective hydraulic primary actuators 74 and 73. These, in turn, are connected to the secondary actuators 77 and 76 which act on points FL' and FR' respectively (ie. on opposing sides) of the balance mechanism, by hydraulic links 72 and 71. Back wheels BR and BL are connected by respective trailing arms 78 and 79 which are hingedly mounted to the body. The trailing arms thus serve as primary actuators for the back wheels. Secondary actuators in the form of levers 80 and 81 act on respective corners BR' and BL' (ie. on the same side) of the balance mechanism 75 by way of ball joints 82 and 83. The levers may be integrally formed with the trailing arms. In alternative forms, they may be separately formed and attached by any appropriate means.

One major difference between this system and the one shown in FIG. 12 is that in this system, the hydraulic links between the front wheels and the balance mechanism are swapped over. This is because, in essence, the balance members 44 and 45 shown in FIG. 12 have been crossed over and joined to form the substantially X-shaped balance mechanism 75. Thus the function of the torque member 49 is performed by the connection between the two notional balance members. This allows considerable simplification of the suspension system, while producing the desired result in terms of handling characteristics.

Another significant difference between the suspension system shown in FIG. 14 and that in FIG. 12 is that balance members 46, 47 and torque member 50 in FIG. 12, used to control the twist mode, have no equivalent in the system shown in FIG. 14. These components have been omitted due to the benefits of a suspension system having a low resistance to twist. As will be illustrated later, however, a small resistance to twist can be provided by spring 91.

The balance mechanism 75 also provides a lateral coupling between the front wheels FR and FL and another coupling between the back wheels BR and BL. These are analogous to balance members 34 and 35 of FIG. 12 respectively. Torsion bar 90 in FIG. 14 is equivalent to torsion bar 48 of FIG. 12, and serves to control the longitudinal pitching of the vehicle.

The balance mechanism 75 also incorporates a longitudinal balance member analogous to balance member 33 of FIG. 12. Link spring 91 in FIG. 14 is joined to this longitudinal balance member. It is equivalent to link 32 in FIG. 12 in that it is the only connection between the balance mechanism 75 and the body that allows a nett vertical force to act between the sprung mass and the four wheels. In this case, the link is between the balance mechanism and a support frame 92 which is affixed to the body. Accordingly, link spring 91 supports the weight of the sprung mass of the vehicle and provides resistance to vehicle bounce or heave.

A front wheel drive car typically has a greater proportion of its weight on the front wheels. Therefore, to provide correct static balance, the spring 91 should be positioned slightly forward of the centre of the balance mechanism or plate 75. Any dynamic variations in front to rear loading are then regulated by the pitch spring 90.

Figure 14C:
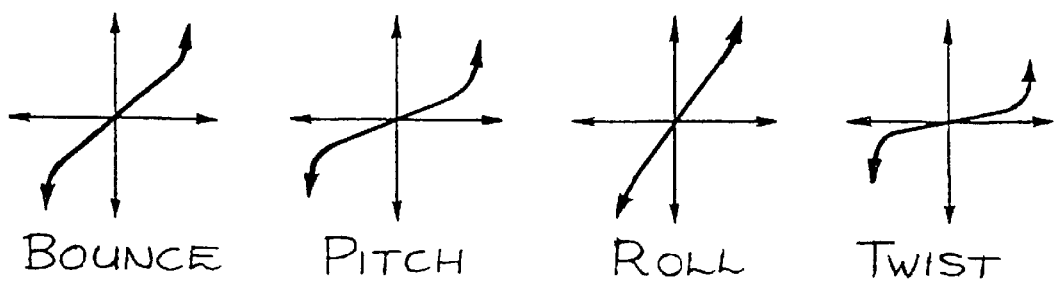

Other than the hydraulic links and wheel control arms, this system has only three major components. Spring link 91 is a coil spring which supports the weight of the sprung mass of the car and controls the bounce mode. Spring 91 also provides a small amount of twist mode stiffness by offering a degree of resistance to the rolling motion of the balance mechanism. Torque member 90 controls the pitch mode, while the roll mode is controlled by the twisting action of the balance mechanism which is itself effectively an integral combination of conceptual balance members and a torque member, as previously described. Thus, if the mechanism is designed as a relatively rigid structure, then the car will have a high roll mode stiffness. FIG. 14c includes graphical representations of the relative spring rates for bounce, pitch, roll and twist to illustrate the principles and to highlight the independent control which the system provides over these suspension modes.

Figure 15A:
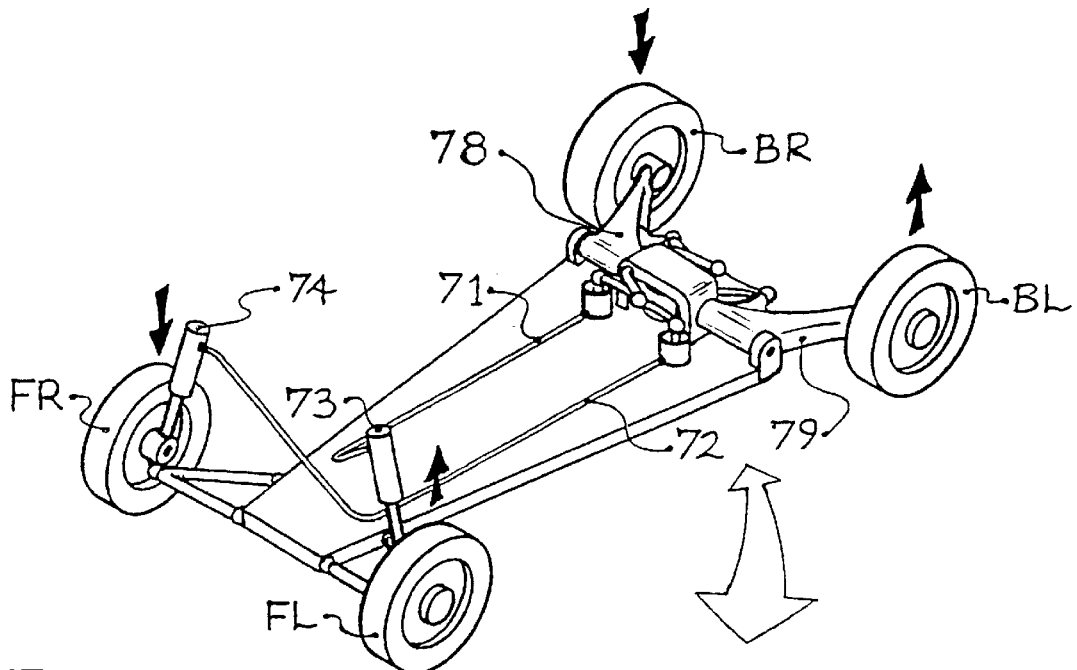
FIGS. 15a, 15b, 16a, 16b, 17a, and 17b show the suspension system of FIG. 14a under the influence of roll, twist and pitch modes.
Figure 15B:
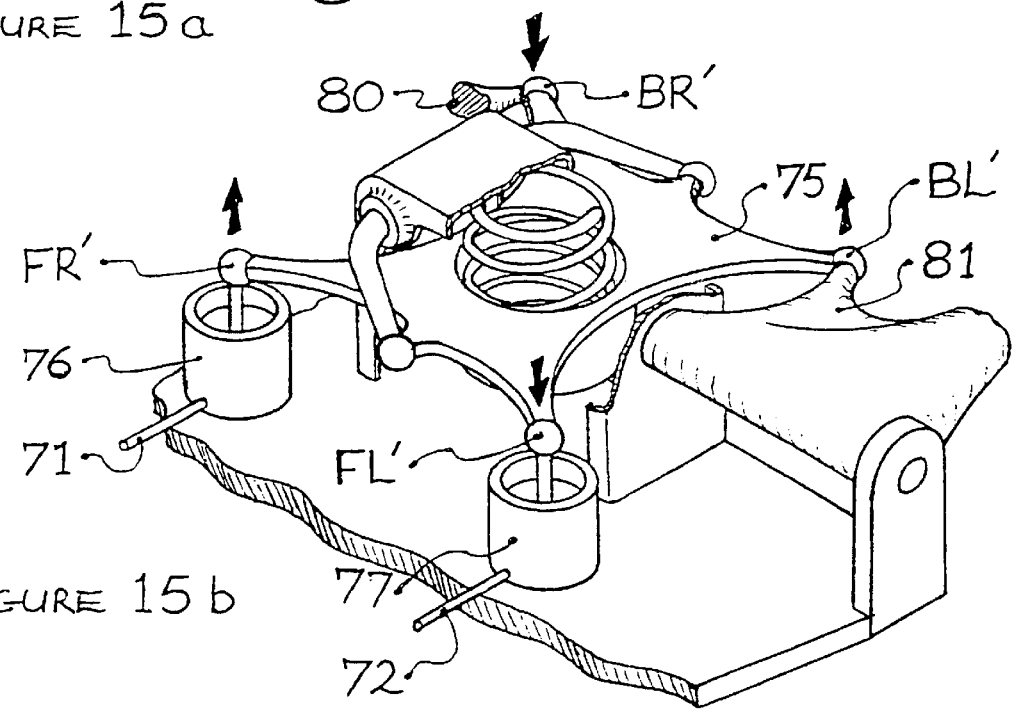

Turning then to describe more fully the operation of the system, FIGS. 15 through to 17 will be used to illustrate how the balanced suspension system responds to the movement modes of roll, twist and pitch respectively. When a vehicle is subjected to body roll, this can be likened to an upwards force being applied to the wheels on one side of the vehicle while a downward force is applied to the wheels on the other side of the vehicle. Such a situation is illustrated in FIG. 15a. The upward force applied to wheel FL moves that wheel up with respect to the body and as a result, hydraulic fluid is pushed out of its respective primary actuator and wheel damper 73, through the connecting hydraulic link 71 to the secondary actuator 76. As a result, the actuator 76 applies an upward force to its respective corner FR' of the balancing mechanism 75. Similarly, as wheel FR moves down under the influence of the applied force, its associated damper 74 draws hydraulic fluid from secondary actuator 77, thereby pulling that corner FL' of the balancing mechanism down. As wheels BL and BR move in response to the respective applied forces, their associated trailing arms apply upward and downward forces respectively to points BL' and BR' by way of levers 81 and 80. Turning to FIG. 15b, it will be apparent that the forces on the balancing mechanism in response to the body roll are balanced, with no nett vertical force, and thus movement of all four wheels is restrained, thereby advantageously preventing body roll, subject to resilient deformation of the balance plate itself. Furthermore, the cornering handling balance of the car can be adjusted by changing the ratio of the distance (F) between the front points FR' and FL' of the balance mechanism and the distance (R) between the rear points BR' and BL'. This change is analogous to a longitudinal movement of the fulcrum points of the notional balance members 44 and 45 of FIG. 12 that are crossed over and incorporated integrally in the balance mechanism 75. Making the ratio F/R greater will move the handling balance towards oversteer, and making F/R smaller will move the handling balance towards understeer.

Figure 16A:
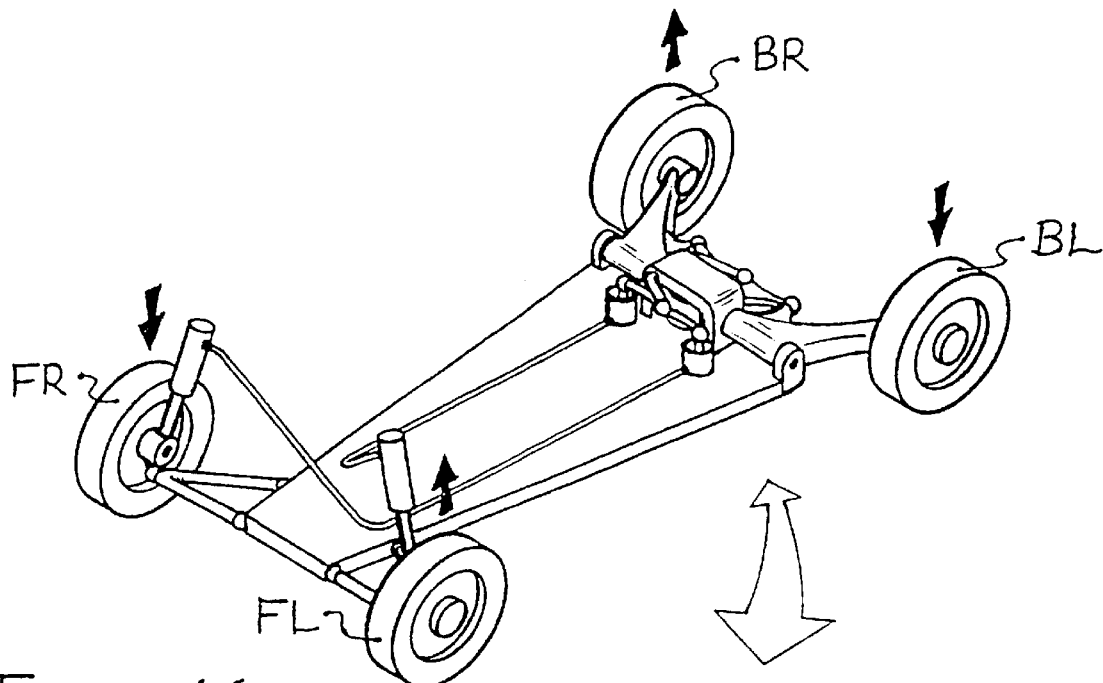
Figure 16B:
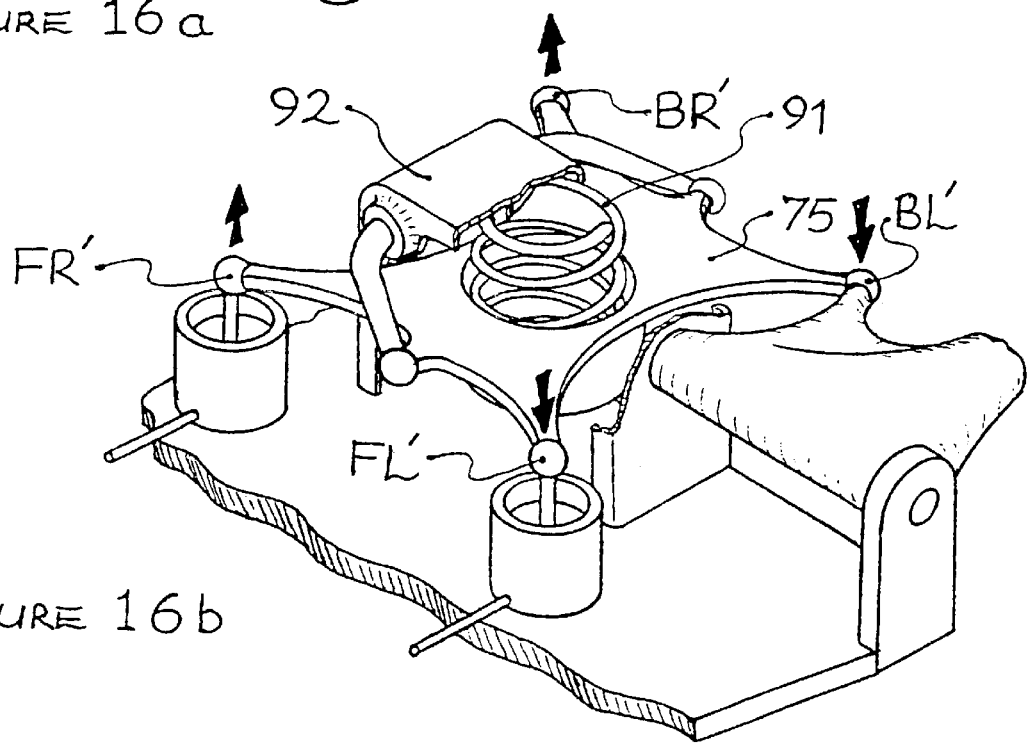

Another advantage of this system is that it provides a soft twist mode, thereby allowing all four wheels to remain in firm contact with the ground. This ensures that the weight of the vehicle is evenly distributed over each of the four wheels, thus ensuring good grip. FIG. 16a shows the vehicle of FIG. 14 under the influence of a twisting movement as occurs when the vehicle moves over undulating ground. In this case, diagonally opposite wheels FL and BR are subjected to an upward force, whilst diagonally opposite wheels FR and BL effectively have a downward force applied. As a result of the cross over from the front wheels FL and FR to their respective contact points FR' and FL' on the balancing mechanism 75, the resultant force on the balancing mechanism from both front and rear wheels is an upward force on the right hand side of the mechanism and a downwards force on the left hand side of the mechanism. In the suspension system illustrated, only spring 91 positioned between the support frame 92 and the balancing mechanism 75 is able to provide any resistance to such a rolling motion. Accordingly, there is little resistance to twist. This advantageously allows the wheels to move so as to remain in contact with the road, thereby maximising the grip provided by the tyres.

Figure 17A:
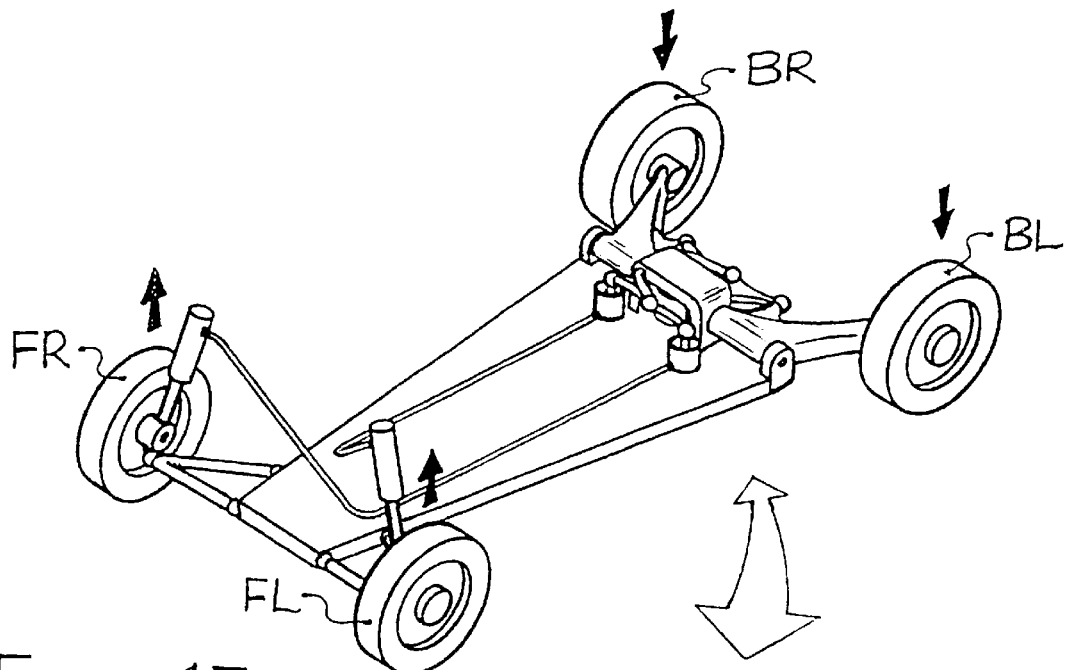
Figure 17B:
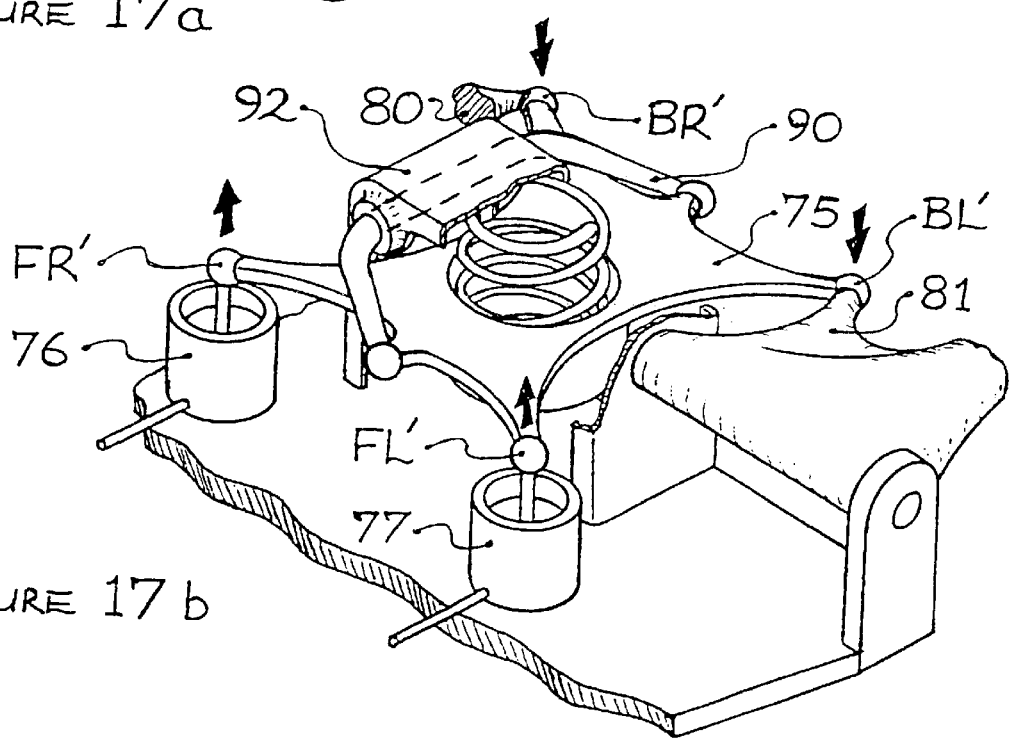

By affixing the torsion bar 90 to the support frame 92 and the balance mechanism, the pitching of the vehicle due to hard acceleration or braking can be moderated. FIGS. 17*a* and 17*b* illustrate the vehicle of FIG. 14 under the influence of pitching forces which may result from heavy braking. This is equivalent to upward forces being applied to the front wheels FL and FR whilst a downward force is applied to each of the back wheels BL and BR. Consequently, and regardless of the cross over configuration of the front wheels, an upward force is applied by each of the front actuators 76 and 77 to contact points FR' and FL', whilst each of the rear levers 81 and 80 provides a downward force to their respective contact points BL' and BR' on the balancing mechanism 75. The resulting movement of the balance mechanism is resisted by the torsion bar 90, which is affixed to the support frame 92. Furthermore, the distribution of forces between the right wheels and left wheels is determined by the position of the joints connecting the torsion bar 90 and the balance mechanism 75. Positioning of these joints on the longitudinal centreline of the balance mechanism will ensure an even distribution between the right and left wheels of the longitudinal load transfer.

Bouncing of the vehicle, where each wheel is subjected to an upward force or alternatively, each wheel is subjected to a downward force, is resisted by the spring 91 (and optionally a supplementary damper) positioned between the balancing mechanism 75 and the support frame 92. It will be appreciated by those skilled in the art, however, that the modes of pitch and bounce may alternatively or additionally be controlled by any number of known methods.

Figure 18A:
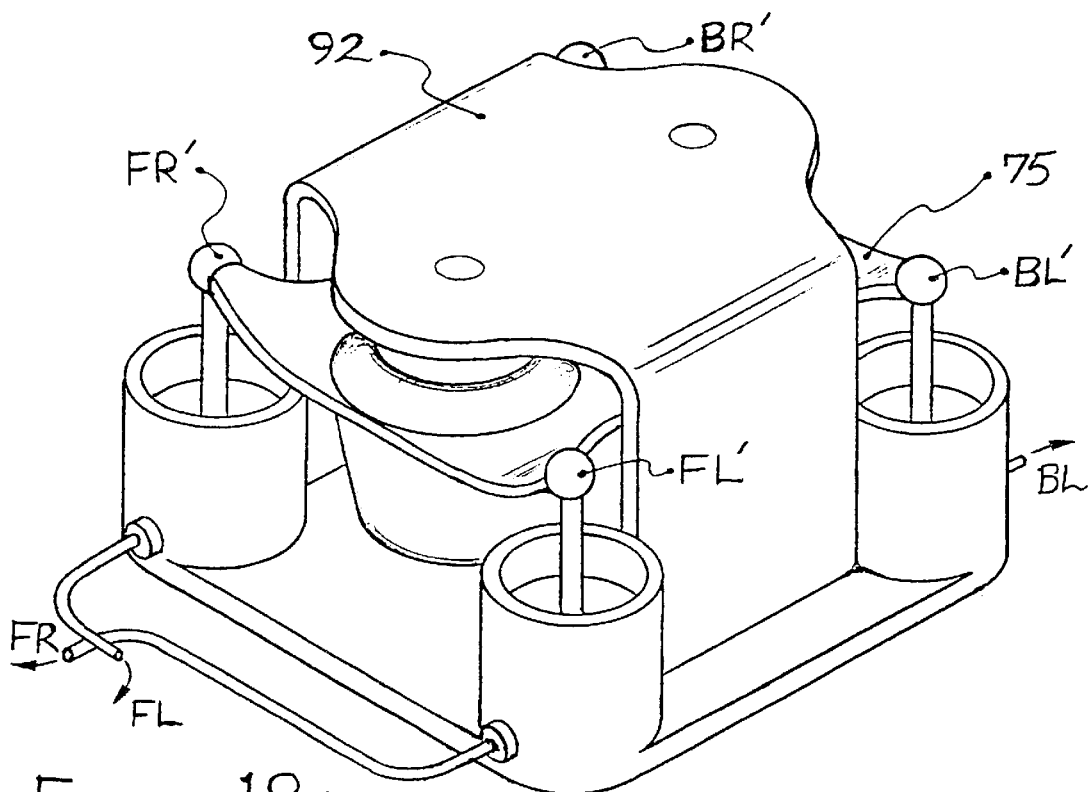
FIG. 18a shows a second practical embodiment of the suspension system according to the invention.

FIG. 18*a* shows the balance mechanism of a balanced suspension system suitable for a luxury car or a truck or a bus. Features corresponding to those previously described with reference to FIG. 14 will be denoted by corresponding reference numerals. In this embodiment, each of the four wheels FL, FR, BL and BR is connected to the balance mechanism 75 via hydraulic links with built in damping. As with FIG. 14, there is a crossover of these links at one end of the car so that the roll mode stiffness is determined by the torsional rigidity of balance plate or mechanism 75 and twist mode stiffness is determined by the resistance of the mechanism 75 to a rolling motion. In FIG. 18*a*, two air springs 101 and 102 perform the functions of springs 90 and 91 in FIG. 14. The bounce mode spring rate is thus determined by the spring rates of springs 101 and 102 in parallel, while the pitch mode spring rate is determined by the average of the spring rates of springs 101 and 102 and the distance between them. Typical spring rate graphs are shown in FIG. 18*c*.

One advantage of this layout is that it is relatively easy to make the system self levelling. To this end, integrated position sensor and air valves 103 and 104 monitor the vertical displacement of the front and rear of the balance mechanism 75, which corresponds to the height of the front and rear of the vehicle body, and allow more or less compressed air into the pneumatic springs 101 and 102 to maintain a level ride height regardless of passenger and luggage loads. The self-levelling capability also means that the bounce and pitch mode spring rates can be made even softer, as there is less possibility of the suspension bottoming when carrying a heavy load. This results in a more comfortable ride. However, unlike a conventional suspension system, the roll mode stiffness can still be kept high for flat cornering while the twist mode stiffness can be kept low to allow good grip.

Another advantage of this system is that it works as a self-contained "black-box". The vertical force at each wheel acts on the wheel cylinder end of the hydraulic link (62 in FIG. 13) and on the wheel control arm joint to the sprung mass (if there is any leverage involved). However, the distribution of the vertical forces on the four wheels is controlled by the balance mechanism 75, and the forces of hydraulic cylinders (64 in FIG. 13) and air springs 101 and 102 are isolated within this unit. The "black-box" nature of the main balance mechanism means that it can be mounted in any location and in any orientation within the car, thereby simplifying the layout of components during design, enhancing space efficiency and enabling a more optimal weight distribution.

Figure 19A:
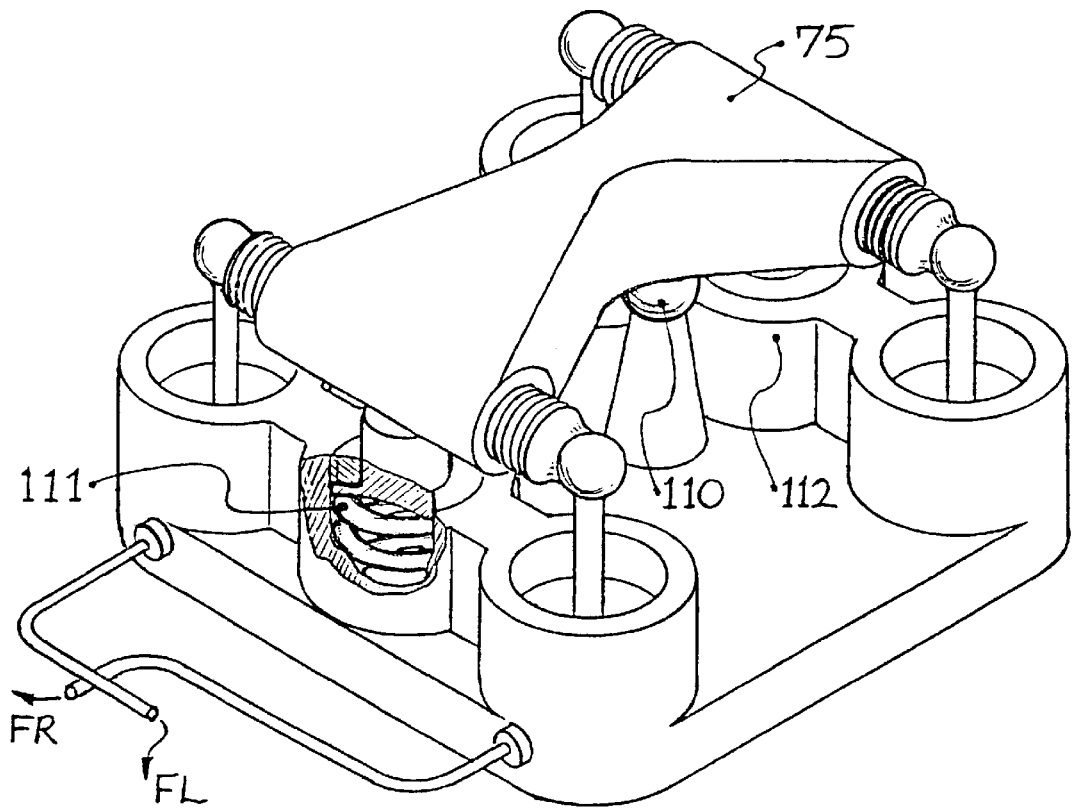
FIG. 19a shows a third practical embodiment of the suspension system according to the invention.

The suspension system shown in FIG. 19*a* would be suitable for a racing car with high aerodynamic downforces. Modern racing cars usually have stiff springs to minimise ride height changes due to the different aerodynamic downforces at different speeds and to prevent bottoming of the low chassis over bumps. They are also usually fitted with anti-roll bars that are used to tune the handling balance between understeer and oversteer. However, the combination of stiff wheel springs and anti-roll bars results in a high twist mode stiffness which leads to loss of grip over any but the flattest of roads. Not only is there a reduction in total grip but the handling balance varies between understeer and oversteer depending on which way the road twists through a corner, making the handling "twitchy" and unpredictable.

The system shown in FIG. 19*a* has four hydraulic links with damping and a crossover as with FIGS. 14 to 18. The bounce mode spring is now a ball joint 110 connecting the balance mechanism 75 directly to the body. The longitudinal position of the ball joint 110 on the mechanism 75 is set to match the front to rear static weight distribution and aerodynamic loading of the car. The bounce mode stiffness of this system is extremely high. Accordingly, the static ride height can be set quite low as there will be minimal ride height change with varying aerodynamic loads. The pitch mode is controlled by the two springs 111 and 112 which perform the function of torque member 48 in FIG. 12. These springs are preloaded against stops so that their spring rate curve is highly non-linear, as shown in FIG. 19*b*. The pitch mode is such that there is no pitch motion during acceleration or braking, although there is enough springiness to absorb harsh bumps. The balance member 75 is designed with a high torsional stiffness so that the roll mode stiffness will be high and there will be minimal body roll during cornering. Conversely, there is little resistance to the rolling motion of the balance mechanism 75 about the ball joint 110, so the twist mode stiffness is low and overall grip correspondingly high. The low twist mode stiffness also absorbs one-quarter of the motion of single wheel bumps, thereby lessening the harshness of ride compared with a fully rigid conventional suspension.

There are two more significant advantages to this system compared with conventional racing car suspensions. Firstly, it is a considerable simplification over existing designs with fewer components and most of the major components packaged in a compact and relocatable unit. Existing designs are constrained to having the springs, dampers, anti-roll bars and associated links and supports fitted relatively high up and at each end of the car, giving undesirable weight distribution. By contrast, the balance mechanism of FIG. 19a can be mounted low down and near the centre of the car for a better weight distribution. It can also be moved longitudinally to adjust the static weight balance between the front and rear wheels. Secondly, as mentioned with regard to FIG. 14, the handling balance between understeer and oversteer can be easily adjusted by changing the relative separations of the links at the front and rear of the mechanism 75. The very low twist mode stiffness of this system means that handling balance is controlled by the geometry of the mechanism rather than by the deflections of wheel springs and anti-roll bars that should result from body roll, but are often adversely affected by twist in the roadway. Uneven road surfaces therefore have less affect on handling balance, resulting in a car that is easier to drive at the limit of tyre grip.

Figure 20A:
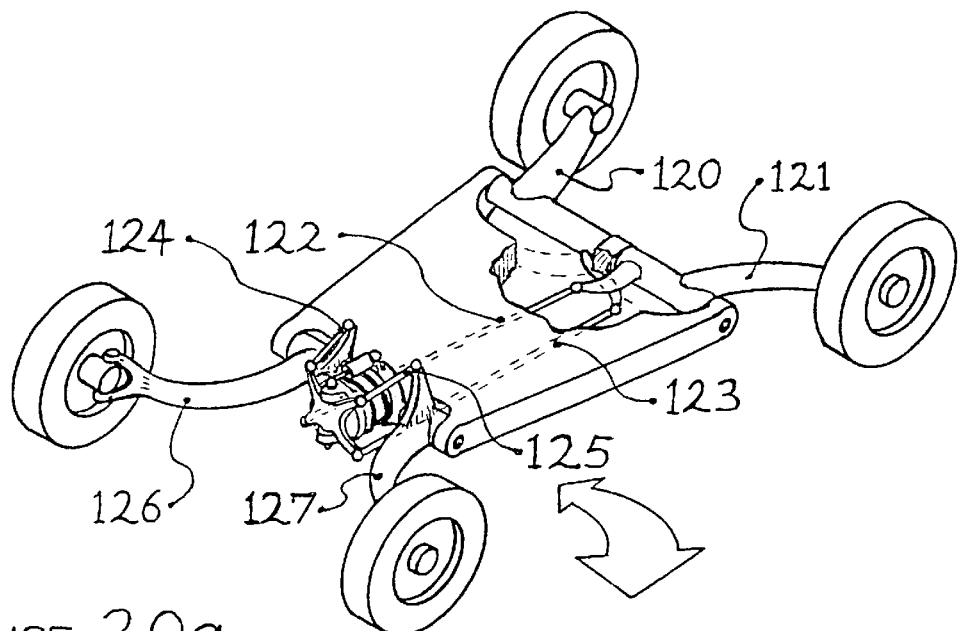
FIG. 20a shows a fourth practical embodiment of the suspension system according to the invention.
Figure 20B:
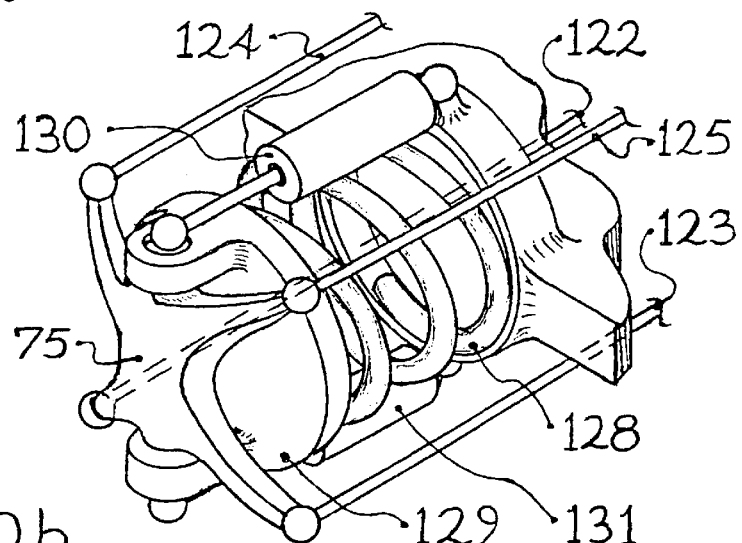

FIGS. 20a and 20b show a suspension system that would suit a minimalist, versatile, budget priced car. In this context, the Citroen 2CV mentioned previously was designed as a low cost vehicle "that would allow a French farmer and his wife to take a load of eggs to market, travelling over a ploughed field without breaking any of the eggs". The 2CV achieved this "softest of rides" goal whilst also being widely recognised as the cheapest car to manufacture of the post war period.

The 2CV's remarkably smooth ride over bumps comes at the cost of large angles of body roll during cornering. The body roll results in the wheels also leaning over during cornering (there is no camber change relative to the body during wheel bounce), but since the wheels were relatively narrow and of a rounded cross section the 2CV was able to retain relatively high levels of lateral grip. The smooth ride over rough terrain and high levels of lateral grip resulted from the extremely soft pitch and twist modes. The poor handling was a result of the roll mode stiffness being equal to the moderately soft bounce mode.

In FIGS. 20a and 20b, the crossover that allows for a simpler balance mechanism is achieved at the rear wheel control arms 120 and 121. Pullrods 122 and 123 take the wheel loads from the rear wheel control arms to the balance mechanism 75 whilst pullrods 124 and 125 take the wheel loads from the front wheel control arms 126 and 127 to the balance mechanism. The mechanism is connected to a coil spring 128 via a hinged saddle 129 that offers little resistance to rolling motion of the balance mechanism and therefore gives the suspension system a very low twist mode stiffness. The large diameter of spring 128 resists the pitching motion of the mechanism and gives a soft pitch mode while a uniform compression of the spring provides moderate bounce mode stiffness. As discussed with reference to previous embodiments, the torsional stiffness of the balance mechanism 75 controls the roll mode stiffness.

The two dampers 130 and 131 control the bounce mode when acting together, and the pitch mode when acting in opposition. Since the twist mode stiffness is low, it does not require a damper, and if the roll mode stiffness is high enough it may not need a damper. However, the inherent springiness of the tyres may require the two dampers to be replaced by four dampers, one at each wheel.

Figure 20C:
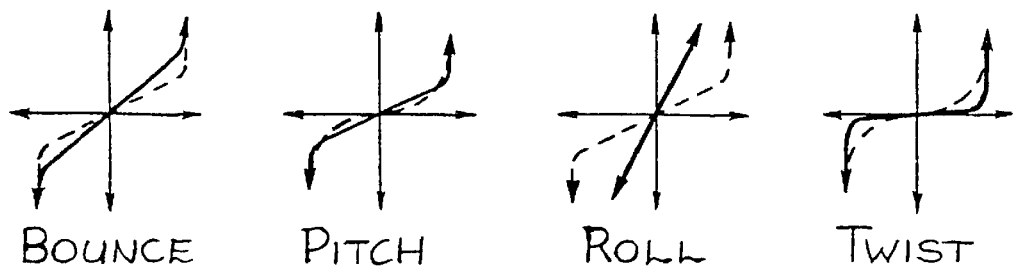

Typical graphs for the modal spring rates are shown at the bottom of FIG. 20c with the modal rates for a 2CV shown as dotted lines for comparison. The main advantages of this system over a 2CV are that the roll mode is much stiffer, giving flatter cornering, and the twist mode is even softer, enabling similar high levels of grip and an even more comfortable ride. The high roll mode stiffness would also keep the wheels perpendicular to the ground, so wider low profile tyres could be used for higher levels of grip. The wheel control arms and pullrods would be similar to those used in the 2CV. However, whereas the 2CV has four coil springs, four rubber springs and four dampers, the system of FIG. 20a has only one coil spring, one balance member and two (or possibly four) dampers. Accordingly, this suspension system should be even less expensive than that of the 2CV.

The balance suspension system of FIG. 12 has the corners of the rectangular balance mechanism connected to the wheels at the corresponding corners of the vehicle. The front left corner of the balance mechanism is connected to the front left wheel, and so on. In FIGS. 14 to 20 the balance mechanism is considerably simplified by crossing over the connections between wheels and balance mechanism at one end of the vehicle. It is useful to examine what happens when the wheels are connected to the balance mechanism in different ways.

Figures 21A, 21B:
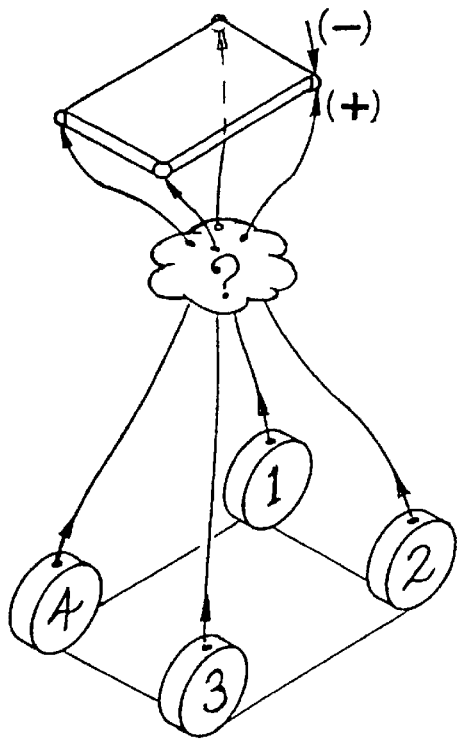
FIGS. 21a and 21b tabulate a number of possible connection schemes for a suspension system according to the invention.

FIGS. 21a shows the four wheels of a vehicle below a generally rectangular balance mechanism. The four wheels are connected to the four corners of the balance mechanism, via primary and secondary actuating elements, in an undisclosed manner. The forces at the corners of the balance mechanism act in a generally perpendicular direction to the plane of the rectangular mechanism. An upwards force at the wheelprints can act on the corners of the balance mechanism from either one side (+) or the other side (−) of the mechanism.

There are 24 (=4×3×2×1) permutations for the connections of the four wheels to the four corners of the balance mechanism. For each of these permutations there are 16 (=2×2×2×2) further permutations due to the forces being able to act from either one, or the other, side of the mechanism. That is, there are 384 (=24×16) different ways of connecting the wheels to the balance mechanism.

In FIG. 12 a bounce motion of the wheelprints corresponds to a bounce motion of the balance mechanism, and similarly for the other modes. However, in FIGS. 14 to 20, while the bounce and pitch modes of the wheelprints and balance mechanism correspond, a rolling motion of the wheelprints will produce a twisting motion of the balance mechanism, and vice versa. In general, the different permutations cause the corners of the balance mechanism to move in a different manner to the wheelprints.

In 192 (=384/2) of the permutations described above, a purely bouncing motion of the wheelprints will cause the balance mechanism to undergo a mixture of bounce, pitch, roll and twisting motions. Likewise, purely pitch, roll or twisting motions of the wheelprints result in a mixing of the modes in the balance mechanism.

Of the remaining 192 permutations many are rotations or reflections of each other. FIG. 21b lists 24 of these permutations. This listing shows that it is possible to make any mode of wheelprint motion correspond to any mode of balance mechanism motion. At the left of each entry are the numbers 1 to 4 in a rectangular box that represents the balance mechanism of FIG. 21a. Each number indicates the wheel that is connected to that corner of the balance mechanism. A minus (−) sign indicates that an upwards force at the wheelprint acts on its corner of the balance mechanism in a direction opposite to those wheels without the minus sign. The next four columns indicate how the balance mechanism will move when the wheelprints undergo bounce, pitch, roll or twist motions.

The balanced suspension of FIG. 12 is represented by the first entry in FIG. 21b. Here it is seen that there is a one to one correspondence between the wheelprint and balance mechanism modes. The suspensions of FIGS. 14 to 19 are represented by the second entry in FIG. 21b. Here it is seen that the bounce and pitch modes correspond, but the roll and twist modes are interchanged between the wheelprints and balance mechanism. The suspension of FIG. 20 is represented by a permutation that is not shown in FIG. 21b, but is virtually identical to the second entry—the only difference being that the rear connections are crossed over rather than the front connections.

It should be noted here that the general conception of balanced suspension does not require that the forces acting on the balance mechanism be perpendicular to its plane. Nor does the balance mechanism have to be of a generally rectangular shape, or even of a mechanical nature. The purpose of FIG. 21b is only to indicate some of the variations that are possible with a mechanical balance mechanism similar to those described in the preceding pages.

Figure 22:
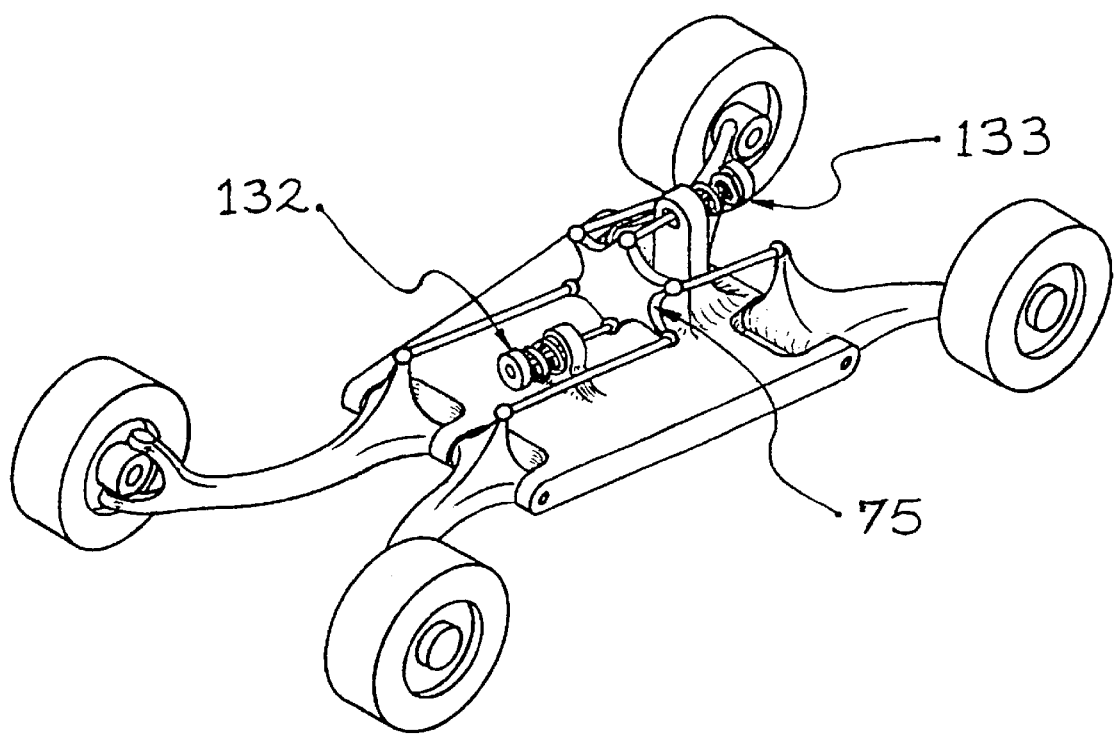
FIG. 22 shows another practical embodiment of the suspension system according to the invention.

One such variation is shown in FIG. 22. This embodiment would be suitable for an off-road, four wheel drive vehicle. The wheels are connected to the chassis via independent leading and trailing control arms, similarly to FIG. 20. Pushrods take the wheel loads from the control arms to the balance mechanism 75, which would be housed in the underfloor space typically available on such vehicles. If "live axles" were used, the wheel loads could be transmitted via the axle locating links in a manner similar to that shown. Two spring-damper units, 132 and 133, control the movement of the balance mechanism relative to the body of the vehicle. The springs act on the balance mechanism via pullrods, and the dampers are not explicitly shown.

The balanced suspension system of FIG. 22 is represented in the listing of FIG. 21b by the eighth entry. Here the four wheels are connected to the corresponding corners of the balance mechanism, but the two connections at one end of the car are reversed in direction. As a result wheelprint bounce corresponds to balance mechanism pitch, and respectively, pitch to bounce, roll to twist, and twist to roll.

As in the previously described embodiments the rolling motion of the balance mechanism would be left free giving the suspension a desirable soft twist mode. Likewise the torsional stiffness of the balance mechanism would control the suspension roll mode.

Figure 18B:
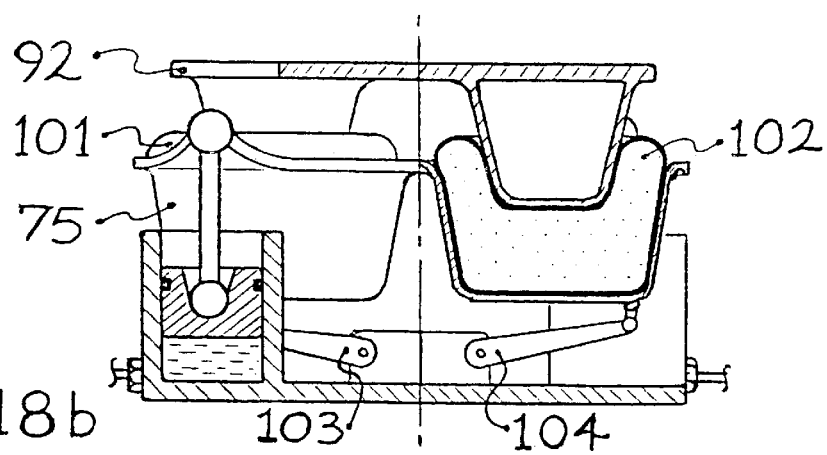
Figure 18C:
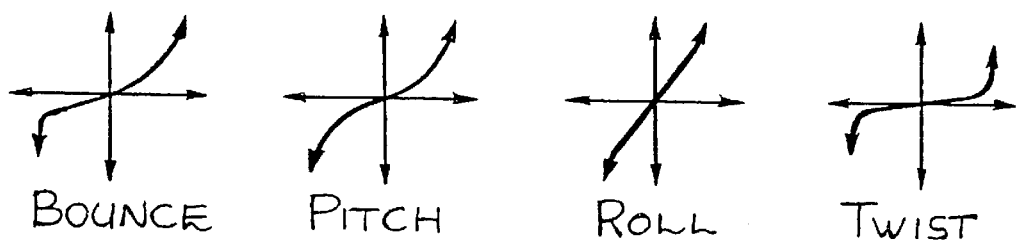
Figure 19B:
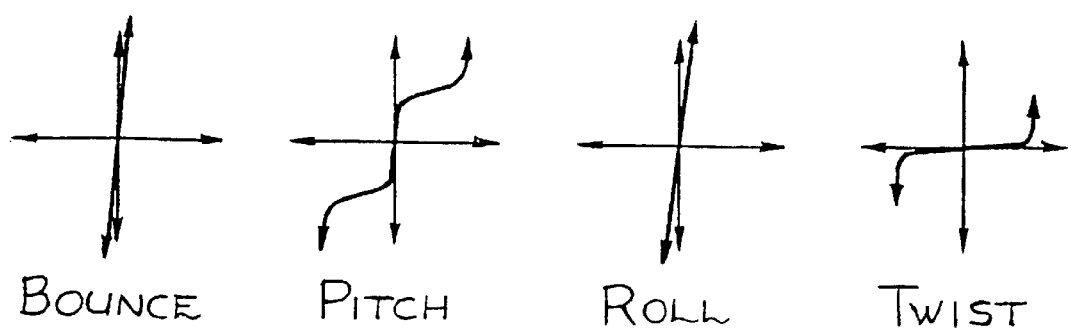

In FIG. 22 the two spring-dampers control the bounce and pitch modes of the balance mechanism in a manner similar to that shown in FIG. 18. However, unlike FIG. 18, the bounce and pitch modes are interchanged in FIG. 22. That is, the wheelprint bounce mode stiffness is determined by the resistance of the balance mechanism to a pitching motion, and the wheelprint pitch mode stiffness is determined by the resistance of the balance mechanism to a translational movement perpendicular to its plane. Using softer springs and mounting them further apart on the balance mechanism will soften the wheelprint pitch mode relative to the bounce mode, and result in a more level ride over harsh bumps.

The two coil springs shown in FIG. 22 could be replaced with a single central coil spring and a "U-bar" torsion spring as is done in FIG. 14. In this case the "U-bar" will control the wheelprint bounce mode. As a result, it will be required to carry the weight of the vehicle and will have to be large enough to provide almost all of the springing for the vehicle. The central coil spring will control the pitch mode of the suspension and will therefore be relatively lightly stressed, and will be loaded in tension or compression depending on whether the vehicle body is pitching forwards or backwards.

In conclusion, the suspension modes of bounce, pitch, roll and twist each involve the vertical movement of all four wheelprints. A conventional suspension system has four separate spring-damper units, each unit independently controlling the vertical movement of one of the four wheels. The bounce, pitch, roll and twist modes of a conventional suspension are thus each dependent on the same set of four spring-damper units, and are therefore intimately related in behaviour. However, in any of the embodiments described above, the suspension system allows the substantial separation of the spring rate behaviours of the four modes of wheelprint movement of bounce, pitch, roll and twist. Since the twist mode has no direct influence on sprung mass motion it can be made very soft, while the bounce and pitch modes can be made suitable for a comfortable ride, and the roll mode can be made stiff enough to minimise body roll through fast corners. Thus, each mode can be independently optimised without compromising the other modes.

Additionally, the balanced nature of the system means that the lateral and longitudinal load transfers that occur during horizontal acceleration are distributed between the four wheels in ratios that are determined by the dimensions of the balance elements within the system, rather than by the spring rates and vertical displacements of the wheelprints. This results in easier tuning of handling balance, and more predictable handling over uneven road surfaces.

The use of hydraulic links to connect the wheel control arms to the main balance unit allows the main balance unit to be located in the most appropriate position for packaging efficiency and weight distribution. The hydraulic links can also double as very effective dampers.

The system is also simple. Compared with a conventional suspension system having four springs, two anti-roll bars and four hydraulic dampers, the present suspension system would have three springs (one bounce, one pitch and the balance member-roll spring) and four hydraulic link-dampers. So there would be very little extra cost, if any, in return for the considerable benefits. In all these respects, the invention thus provides a practical and commercially significant improvement over the prior art.

Although the invention has been described with reference to specific examples it will be appreciated to those skilled in the art that the invention may be embodied in many other forms.

What is claimed is:

1. A suspension system for a vehicle of the type having a body and at least four wheels independently supported for generally vertical movement between upper and lower positions relative to the body, said suspension system including:

a first balance mechanism including a first pair of first and second balance members and first control means integrated into a substantially unitary structure and arranged to support suspension forces in a first mode of suspension movement;

at least four actuating elements responsive respectively to the positions of the wheels relative to the vehicle body, a first pair of said actuating elements being connected to the first balance member, and a second pair of said actuating elements being connected to the second balance member, such that each of said balance members is effectively coupled to an associated pair of said wheels through a respective pair of said actuating elements;

the actuating elements and the first pair of balance members being connected in a first configuration such that each of the balance members distributes suspension forces between the associated wheels in predetermined proportions in the first mode, while freely accommodating relative vertical movement between the associated wheels in other modes;

the first control means being responsive only in the first mode and operating substantially independently of the vehicle body to control relative movement between the first and second balance members, whereby the first balance mechanism effectively isolates and controls the first mode substantially independently of other modes of suspension movement.

2. A suspension system according to claim 1, further including:

a second balance mechanism including a second pair of first and second balance drawings members and second control means arranged to support suspension forces in a second mode of suspension movement;

a third pair of said actuating elements being connected to the first balance member of the second balance mechanism, and a fourth pair of said actuating elements being connected to the second balance member of the second balance mechanism, such that each of said balance members is effectively coupled to an associated pair of said wheels through a respective pair of said actuating elements;

the third and fourth pairs of actuating elements and the second balance mechanism being connected such that each of the balance members of the second pair distributes suspension forces between the associated wheels in predetermined proportions in the second mode, while freely accommodating relative vertical movement between the associated wheels in other modes;

the second control means being responsive only in the second mode and operating substantially independently of the first control means to control relative movement between the second pair of balance members and the vehicle body, whereby the second balance mechanism effectively isolates and controls the second mode substantially independently of other modes of suspension movement.

3. A suspension system according to claim 2, further including:

a plurality of said first and said second balance mechanisms, disposed respectively to support suspension forces in a plurality of selected modes of suspension movement;

selected pairs of said actuating elements being connected respectively to the first and second balance mechanisms in predetermined configurations corresponding to the selected modes;

whereby the balance mechanisms in combination isolate and provide substantially independent control over the selected modes of suspension movement.

4. A suspension system according to claim 3, wherein the modes are selected from the group comprising bounce, pitch, roll, and twist.

5. A suspension system according to claim 4, wherein the first and second balance mechanisms are effectively integrated into a single balance system, in which at least some of the first and second pairs of balance members and at least some of the first control means are effectively integrated into the unitary structure and arranged to operate in conjunction with the respective second control means without loss of independent control over the selected modes of suspension movement.

6. A suspension system according to claim 5, wherein suspension movement in each of the selected modes induces at least one of a force or a displacement in the respective balance mechanism in a manner corresponding to at least one of in, along and about a unique axis.

7. A suspension system according to claim 2, wherein the second control means include an elastically deformable member interposed between the second balance mechanism and the vehicle body.

8. A suspension system according to claim 1, wherein the unitary structure of the first balance mechanism has no movable joints.

9. A suspension system according to claim 8, wherein the unitary structure of the first balance mechanism is provided with a degree of resilient flexibility, being at least partially determinate of response characteristics of the first control means.

10. A suspension system according to claim 9, wherein the unitary structure of the first balance mechanism is effectively formed as a generally "X"-shaped balance plate, with the first and second balance members of the first balance mechanism being formed by respective diagonal arms of the X, and the first control means being formed by an integral interconnection therebetween.

11. A suspension system according to claim 10, wherein the interconnection is resiliently flexible.

12. A suspension system according to claim 5, wherein the unitary structure of the first balance mechanism is effectively formed as a balance plate incorporating said balance system, whereby at least some of the first and second pairs of balance members and at least some of the first control means are effectively integrated into the balance plate and arranged to operate in conjunction with the respective second control means through movement and deflection of the balance plate in predetermined directions corresponding to unique axes associated respectively with the selected modes, thereby to maintain independent control over the selected modes of suspension movement.

13. A suspension system according to claim 12, including four primary actuating elements connected proximally to the respective wheels, and four secondary actuating elements remote from the wheels and operable directly on the balance plate, the primary actuating elements being linked to corresponding secondary actuating elements by respective connecting means.

14. A suspension system according to claim 13, wherein the primary and secondary actuating elements include hydraulic cylinders, and the respective connecting means include hydraulic lines.

15. A suspension system according to claim 13, wherein the primary and secondary actuating elements include mechanical actuators and the respective connecting means include mechanical linkages.

16. A suspension system according to claim 13, wherein the primary and secondary actuating elements include a combination of hydraulic cylinders and mechanical linkages.

17. A suspension system according to claim 13, wherein the connecting means include at least one of pneumatic, electronic and electromechanical connecting elements.

18. A suspension system according to claim 13, wherein the primary and secondary actuating elements are fixedly interconnected.

19. A suspension system according to claim 13, wherein the primary and secondary actuating elements are integrally formed.

20. A suspension system according to claim 13, wherein the vehicle has first and second ends, the primary actuating elements at the first end of the vehicle are connected to the secondary actuating elements operable respectively on a first end but on opposite sides of the first balance mechanism, while the primary actuating elements at the second end of the vehicle are connected to the secondary actuating elements operable respectively on a second end but on the same sides of the first balance mechanism.

21. A suspension system according to claim 13, wherein two of the wheels are a front pair of wheels, and wherein the primary and secondary actuating elements for each of the front pair of wheels are hydraulic rams and are interconnected by hydraulic fluid lines.

22. A suspension system according to claim 21, wherein the ram for each of the front wheels is connected with the secondary actuating element on the opposite side.

23. A suspension system according to claim 13, wherein two of the wheels are rear wheels, and wherein the primary actuating elements for the rear wheels are trailing arms.

24. A suspension system according to claim 23, wherein each of the trailing arms is connected directly to a corresponding corner of the balance plate by means of respective ones of the secondary actuating elements in the form of ball joints.

25. A suspension system according to claim 13, wherein a spring extending between a support frame on the vehicle body and the balance plate distributes the weight of the vehicle amongst the four wheels in a predetermined ratio.

26. A suspension system according to claim 25, wherein the spring forms part of the second control means.

27. A suspension system according to claim 26, wherein the balance plate includes a front portion and a rear portion, and wherein the support frame also carries a torsion bar, the ends of which are attached respectively to the front and rear portions of the balance plate for moderating pitch during acceleration and braking.

28. A suspension system according to claim 13, wherein the balance plate includes front corners and the primary actuating elements include front primary actuating elements, and wherein the front primary actuating elements are respectively connected to the secondary actuating elements on opposite front corners of the balance plate by hydraulic means.

29. A suspension system according to claim 28, wherein the primary actuating elements include rear primary actuating elements and wherein the rear primary actuating elements are connected to respective secondary actuating elements, also by hydraulic means.

30. A suspension system according to claim 13, including ride height control means in the form of a ball joint disposed between the balance plate and a support frame fixed to the vehicle body.

31. A suspension system according to claim 13, including anti-pitch control means in the form of a pair of longitudinally spaced apart springs acting on the balance plate.

32. A suspension system according to claim 31, wherein the springs form part of the second control means.

33. A suspension system according to claim 32, wherein said springs are pre-loaded against stops to provide a predetermined response to harsh bumps once a threshold pre-load force is overcome, while minimizing pitch during normal acceleration and braking.

34. A suspension system according to claim 13, wherein said second control means include a pair of mutually opposed spring damper units longitudinally spaced apart on said balance plate.

* * * * *

UNITED STATES PATENT AND TRADEMARK OFFICE
CERTIFICATE OF CORRECTION

PATENT NO. : 6,702,265 B1
DATED : March 9, 2004
INVENTOR(S) : Erik Zapletal

It is certified that error appears in the above-identified patent and that said Letters Patent is hereby corrected as shown below:

Column 25,
Line 13, delete "drawings"

Column 26,
Line 14, replace "determinate" with -- determinative --

Signed and Sealed this

Tenth Day of August, 2004

JON W. DUDAS
*Acting Director of the United States Patent and Trademark Office*